United States Patent
Kim

(10) Patent No.: US 9,588,594 B2
(45) Date of Patent: Mar. 7, 2017

(54) ELECTRONIC DEVICE, METHOD FOR CONTROLLING THE ELECTRONIC DEVICE, RECORDING MEDIUM, AND EAR-JACK TERMINAL CAP INTERWORKING WITH THE ELECTRONIC DEVICE

(71) Applicant: Samsung Electronics Co., Ltd., Gyeonggi-do (KR)

(72) Inventor: Seok-Weon Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/797,558

(22) Filed: Jul. 13, 2015

(65) Prior Publication Data

US 2016/0048218 A1    Feb. 18, 2016

(30) Foreign Application Priority Data

Aug. 14, 2014 (KR) .......................... 10-2014-0105836

(51) Int. Cl.
*G06F 3/02* (2006.01)
*H04M 1/725* (2006.01)
*H04M 1/02* (2006.01)
*H04M 1/23* (2006.01)

(52) U.S. Cl.
CPC ...... *G06F 3/0202* (2013.01); *H04M 1/72527* (2013.01); *H04M 1/0254* (2013.01); *H04M 1/236* (2013.01)

(58) Field of Classification Search
CPC . G06F 3/0202; H04M 1/0225; H04M 1/0254; H04M 1/72527; H04M 1/72522

USPC .............................................. 455/557, 556.1
See application file for complete search history.

(56) References Cited

U.S. PATENT DOCUMENTS

| 4,937,404 | A | * | 6/1990 | Kitagawa | ........... | H01R 13/7035 |
| | | | | | | 200/51.09 |
| 5,092,795 | A | * | 3/1992 | Kitagawa | ............... | H01R 24/58 |
| | | | | | | 439/668 |
| 5,277,197 | A | * | 1/1994 | Church | .................. | A61B 5/486 |
| | | | | | | 600/546 |

(Continued)

FOREIGN PATENT DOCUMENTS

| JP | 2013-187900 A | 9/2013 |
| KR | 10-2006-0029402 A | 4/2006 |

(Continued)

OTHER PUBLICATIONS

Young Woo Jeong; "Pressy-Another button on your smartphone"; in Naver Blog [online]; Aug. 30, 2013; http://jyw20.blog.me/90180158927.

*Primary Examiner* — Hai V Nguyen
(74) *Attorney, Agent, or Firm* — Cha & Reiter, LLC

(57) ABSTRACT

An electronic device, a method for controlling the electronic device, a recording medium, and an ear-jack terminal cap interworking with the electronic device are provided. The method includes determining whether an ear-jack terminal cap has been inserted into an ear-jack terminal provided in the electronic device, setting at least one function for a button of the ear-jack terminal cap, and performing the set at least one function, upon receipt of an input of the button of the ear-jack terminal cap.

17 Claims, 23 Drawing Sheets

(56) References Cited

U.S. PATENT DOCUMENTS

| | | | | |
|---|---|---|---|---|
| 5,277,628 A * | 1/1994 | Lin | H01R 24/58 | 439/668 |
| 5,488,258 A * | 1/1996 | Honda | H03F 1/305 | 307/112 |
| 5,570,427 A * | 10/1996 | Nishioka | H03G 3/348 | 381/94.5 |
| 5,718,605 A * | 2/1998 | Morikawa | H01R 12/707 | 439/108 |
| 5,887,070 A * | 3/1999 | Iseberg | H04R 1/1016 | 181/130 |
| 6,069,960 A * | 5/2000 | Mizukami | H04R 5/04 | 381/120 |
| 6,516,067 B1 * | 2/2003 | Lee | H03G 3/348 | 381/94.1 |
| 6,524,138 B1 * | 2/2003 | Li | H01R 24/58 | 439/669 |
| 6,595,804 B2 * | 7/2003 | Nagata | H01R 24/58 | 439/668 |
| 6,851,975 B2 * | 2/2005 | VanEpps, Jr. | H01R 24/58 | 439/592 |
| 6,856,046 B1 * | 2/2005 | Scarlett | H01R 29/00 | 307/125 |
| 6,866,527 B2 * | 3/2005 | Potega | H01R 24/58 | 439/218 |
| 7,215,980 B2 * | 5/2007 | Chai | H04M 1/0279 | 379/144.04 |
| 7,226,319 B2 * | 6/2007 | Woo | H01R 24/58 | 439/668 |
| 7,269,446 B2 * | 9/2007 | Yoo | H04M 1/6058 | 381/375 |
| 7,361,061 B2 * | 4/2008 | Kim | H01R 24/58 | 439/668 |
| 7,519,185 B2 * | 4/2009 | Liang | H04R 5/04 | 381/74 |
| 8,130,193 B2 * | 3/2012 | Flynt | G06F 3/0338 | 345/156 |
| 8,251,752 B2 * | 8/2012 | Kuhne | A61B 18/14 | 439/188 |
| 8,280,038 B2 * | 10/2012 | Johnson | H04R 1/1041 | 379/430 |
| 8,308,511 B2 * | 11/2012 | Zhang | H01R 13/52 | 439/607.01 |
| 8,467,828 B2 * | 6/2013 | Johnson | H01R 13/703 | 455/556.1 |
| 8,521,243 B2 * | 8/2013 | Sato | A61B 5/4017 | 600/310 |
| 8,525,802 B2 * | 9/2013 | Kim | G06F 3/0416 | 345/173 |
| 8,626,961 B2 * | 1/2014 | Stenmark | H04M 1/7253 | 710/15 |
| 8,798,285 B2 * | 8/2014 | Hung | G06F 13/409 | 381/74 |
| 8,831,241 B2 * | 9/2014 | Ma | H04R 3/007 | 381/74 |
| 8,854,299 B2 * | 10/2014 | Bender | G06F 1/1694 | 345/156 |
| 9,007,511 B2 * | 4/2015 | Naito | G03B 13/36 | 348/333.06 |
| 9,055,366 B2 * | 6/2015 | Azmi | H04R 1/1075 | |
| 9,101,270 B2 * | 8/2015 | Jung | A61B 3/1173 | |
| 9,112,469 B2 * | 8/2015 | Wei | H03G 3/20 | |
| 9,113,252 B2 * | 8/2015 | Liu | H01R 24/58 | |
| 9,130,289 B2 * | 9/2015 | Leiba | H01R 13/20 | |
| 9,140,444 B2 * | 9/2015 | Connor | F21V 33/0076 | |
| 9,153,074 B2 * | 10/2015 | Zhou | G06F 1/163 | |
| 9,176,668 B2 * | 11/2015 | Eleftheriou | G06F 3/04842 | |
| 9,258,397 B2 * | 2/2016 | Lee | H04M 1/035 | |
| 9,264,869 B2 * | 2/2016 | Jeong | H04W 4/16 | |
| 9,301,045 B2 * | 3/2016 | Johnson | H01R 13/703 | |
| 9,319,087 B1 * | 4/2016 | Cox, III | H04B 1/3888 | |
| 2004/0175993 A1 * | 9/2004 | Chennakeshu | H01R 13/35 | 439/668 |
| 2005/0096097 A1 * | 5/2005 | Yoo | H04M 1/6058 | 455/569.1 |
| 2006/0083399 A1 * | 4/2006 | Yang | H01R 13/447 | 381/384 |
| 2006/0154688 A1 * | 7/2006 | Chai | H04M 1/0279 | 455/550.1 |
| 2006/0183368 A1 * | 8/2006 | Kim | H01R 24/58 | 439/502 |
| 2006/0221051 A1 * | 10/2006 | Flynt | G06F 3/0338 | 345/156 |
| 2008/0018614 A1 * | 1/2008 | Rekimoto | G06F 1/1616 | 345/173 |
| 2008/0188729 A1 * | 8/2008 | Sato | A61B 5/4017 | 600/340 |
| 2009/0160785 A1 * | 6/2009 | Chen | G06F 3/04883 | 345/173 |
| 2010/0035474 A1 * | 2/2010 | Xu | G06K 7/0021 | 439/630 |
| 2011/0022203 A1 * | 1/2011 | Woo | G06F 9/4413 | 700/94 |
| 2011/0093643 A1 * | 4/2011 | Hung | G06F 13/409 | 710/316 |
| 2012/0317314 A1 * | 12/2012 | Choi | H04M 1/72527 | 710/8 |
| 2013/0021236 A1 * | 1/2013 | Bender | G06F 1/1694 | 345/156 |
| 2013/0070948 A1 * | 3/2013 | Lee | H04M 1/04 | 381/334 |
| 2013/0076632 A1 * | 3/2013 | Sirpal | G06F 3/1438 | 345/168 |
| 2013/0183946 A1 * | 7/2013 | Jeong | H04W 4/16 | 455/414.1 |
| 2013/0212515 A1 * | 8/2013 | Eleftheriou | G06F 3/04886 | 715/773 |
| 2013/0236025 A1 * | 9/2013 | Ma | H04R 3/007 | 381/74 |
| 2013/0321691 A1 * | 12/2013 | Naito | G03B 13/36 | 348/345 |
| 2013/0346168 A1 * | 12/2013 | Zhou | G06F 1/163 | 705/14.4 |
| 2014/0093116 A1 * | 4/2014 | Liu | H01R 24/58 | 381/384 |
| 2014/0128132 A1 * | 5/2014 | Cox, III | H04B 1/3888 | 455/575.8 |
| 2014/0132932 A1 * | 5/2014 | Jung | A61B 3/1173 | 351/221 |
| 2014/0133671 A1 * | 5/2014 | Son | H04R 5/0335 | 381/74 |
| 2014/0161274 A1 * | 6/2014 | Singamsetty | H04R 1/1041 | 381/74 |
| 2014/0205131 A1 * | 7/2014 | Azmi | H04R 1/1075 | 381/380 |
| 2014/0302705 A1 * | 10/2014 | Park | H01R 12/714 | 439/374 |
| 2014/0354839 A1 * | 12/2014 | Yu | H04N 5/23203 | 348/211.99 |
| 2015/0049487 A1 * | 2/2015 | Connor | F21V 33/0076 | 362/277 |
| 2015/0074538 A1 * | 3/2015 | Wu | G06F 9/44 | 715/736 |
| 2015/0111620 A1 * | 4/2015 | Hwang | H04M 1/0258 | 455/569.1 |
| 2015/0121285 A1 * | 4/2015 | Eleftheriou | G06F 3/04842 | 715/773 |
| 2015/0128031 A1 * | 5/2015 | Lee | G06F 3/0488 | 715/238 |
| 2015/0244751 A1 * | 8/2015 | Lee | H04N 21/41407 | 709/219 |
| 2015/0245513 A1 * | 8/2015 | Moon | G06F 1/20 | 361/679.01 |
| 2015/0253462 A1 * | 9/2015 | Chen | G01W 1/04 | 702/2 |
| 2015/0277603 A1 * | 10/2015 | Tang | H04M 1/72519 | 345/173 |
| 2015/0338385 A1 * | 11/2015 | Lee | G01N 33/00 | 307/116 |

(56) References Cited

U.S. PATENT DOCUMENTS

| | | | |
|---|---|---|---|
| 2016/0070464 A1* | 3/2016 | Hong | G06F 3/04886 715/773 |
| 2016/0072933 A1* | 3/2016 | Cox, III | H04M 1/185 455/575.8 |
| 2016/0080854 A1* | 3/2016 | Chen | H04R 3/00 381/74 |
| 2016/0165420 A1* | 6/2016 | Jeong | H04W 4/16 455/414.1 |

FOREIGN PATENT DOCUMENTS

| KR | 10-2007-0047602 A | * | 5/2007 |
| KR | 10-2013-0048887 A | * | 5/2013 |
| KR | 10-2014-0044001 A | | 4/2014 |

* cited by examiner

ELECTRONIC DEVICE, METHOD FOR CONTROLLING THE ELECTRONIC DEVICE, RECORDING MEDIUM, AND EAR-JACK TERMINAL CAP INTERWORKING WITH THE ELECTRONIC DEVICE

CLAIM OF PRIORITY

This application claims the benefit under 35 U.S.C. §119(a) of a Korean patent application filed in the Korean Intellectual Property Office on Aug. 14, 2014 and assigned Serial No. 10-2014-0105836, the entire disclosure of which is incorporated herein by reference, for all purposes.

TECHNICAL FIELD

The present disclosure relates to an electronic device, a method for controlling the electronic device, a recording medium, and an ear-jack terminal cap interworking with the electronic device.

BACKGROUND

Along with the rapid proliferation of electronic devices such as smart phones, accessories mounted to a smart phone, can include a hands-free. For example, an electronic device such as a smart phone can be configured with an earphone terminal that can be connected to a 4-way earphone. A user may then connect an earphone to the earphone terminal of the electronic device and hear voice of the other party during a call or multimedia sound played in the electronic device.

An electronic device can be provided with a hole-shaped ear-jack terminal. If a user does not use the ear-jack terminal, the user could use the electronic device with the ear-jack terminal covered with an ear-jack terminal cap to render the ear-jack terminal waterproof and/or dustproof.

In the above electronic device, the ear-jack terminal would be used for connection to an earphone. If the ear-jack terminal is not connected to an earphone, the ear-jack terminal would be open. As a result, dust or water may be introduced into the ear-jack terminal, thereby making the electronic device out of order.

The above information is presented as background information only to assist with an understanding of the present disclosure. No determination has been made, and no assertion is made, as to whether any of the above might be applicable as prior art with regard to the present disclosure.

SUMMARY

Certain aspects of the present disclosure may address at least some of the above-mentioned problems and/or disadvantages and may provide at least the advantages described below. Accordingly, an aspect of the present disclosure may be to provide an electronic device for performing various user-set functions(s) or operation(s) through an ear-jack terminal cap.

According to an aspect of the present disclosure, an ear-jack terminal cap may be provided for waterproofness and/or dustproofness, as well as providing functions that may interwork with electronic devices having diverse functions to increase user convenience Another aspect of the present disclosure may provide a method for controlling an electronic device that performs various user-set functions(s) or operation(s) through an ear-jack terminal cap In accordance with an aspect of the present disclosure, there may be provided a method for controlling an electronic device. The method includes determining whether an ear-jack terminal cap is inserted into an ear-jack terminal provided in the electronic device, setting at least one function for a button of the ear-jack terminal cap, and performing the set at least one function, upon receipt of an input of the button of the ear-jack terminal cap In accordance with another aspect of the present disclosure, there may be provided a method for controlling an electronic device. The method includes determining whether an ear-jack terminal cap is inserted into an ear-jack terminal provided in the electronic device, and performing a function corresponding to a specific gesture, when a movement of the electronic device corresponds to the specific gesture, if the ear-jack terminal cap is inserted into the ear-jack terminal.

In accordance with another aspect of the present disclosure, there may be provided an electronic device. The electronic device includes a processor, and an ear-jack terminal. The processor is configured to determine whether an ear-jack terminal cap is inserted into the ear-jack terminal, to receive an input selecting at least one function controllable through the ear-jack terminal cap, if the ear-jack terminal cap is inserted into the ear-jack terminal, and to control execution of the selected at least one function, upon receipt of an input of a button of the ear-jack terminal cap.

In accordance with another aspect of the present disclosure, there may be provided an electronic device. The electronic device includes a processor, and an ear-jack terminal. The processor is configured to determine whether an ear-jack terminal cap is inserted into the ear-jack terminal, and to perform a function corresponding to a specific gesture, when a movement of the electronic device corresponds to the specific gesture, if the ear-jack terminal cap is inserted into the ear-jack terminal.

In accordance with another aspect of the present disclosure, there may be provided a computer-readable recording medium storing instructions set to perform at least one operation by a processor. The at least one operation includes determining whether an ear-jack terminal cap is inserted into an ear-jack terminal provided in an electronic device, displaying button types controllable through the ear-jack terminal cap, if the ear-jack terminal cap is inserted into the ear-jack terminal, and receiving a selection of at least one of the displayed button types and, upon receipt of a button input of the ear-jack terminal cap, performing a function corresponding to the selected at least one button type.

In accordance with another aspect of the present disclosure, there may be provided a computer-readable recording medium storing instructions set to perform at least one operation by a processor. The at least one operation includes determining whether an ear-jack terminal cap is inserted into an ear-jack terminal provided in an electronic device, and performing a function corresponding to a specific gesture, if a movement of the electronic device corresponds to the specific gesture.

In accordance with another aspect of the present disclosure, there may be provided an ear-jack terminal cap interworking with an electronic device. The ear-jack terminal cap includes a fixing portion configured to be inserted into the electronic device and fixing the ear-jack terminal cap inserted into the electronic device, a button portion disposed at a top end of the fixing portion and configured to receive an input for executing a function corresponding to a button type set by a user, and an ear-jack insertion portion configured to be inserted into an ear-jack terminal provided in the electronic device and electrically connected to the electronic device. The ear-jack insertion portion includes a first resistor used for determining whether the ear-jack terminal cap is inserted and a second resistor electrically connected to the button portion, used for determining whether a button input is received. The second resistor is a fixed resistor.

In accordance with another aspect of the present disclosure, there is provided an ear-jack terminal cap interworking with an electronic device. The ear-jack terminal cap includes a fixing portion configured to be inserted into the electronic device and fixing the ear-jack terminal cap inserted into the electronic device, a rotation portion disposed at a top end of the fixing portion and configured to receive an input for executing a function corresponding to a button type set by a user, and an ear-jack insertion portion configured to be inserted into an ear-jack terminal provided in the electronic device and electrically connected to the electronic device. The ear-jack insertion portion includes a first resistor used for determining whether the ear-jack terminal cap is inserted and a second resistor electrically connected to the button portion, used for determining whether the input is received. The second resistor is a variable resistor.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
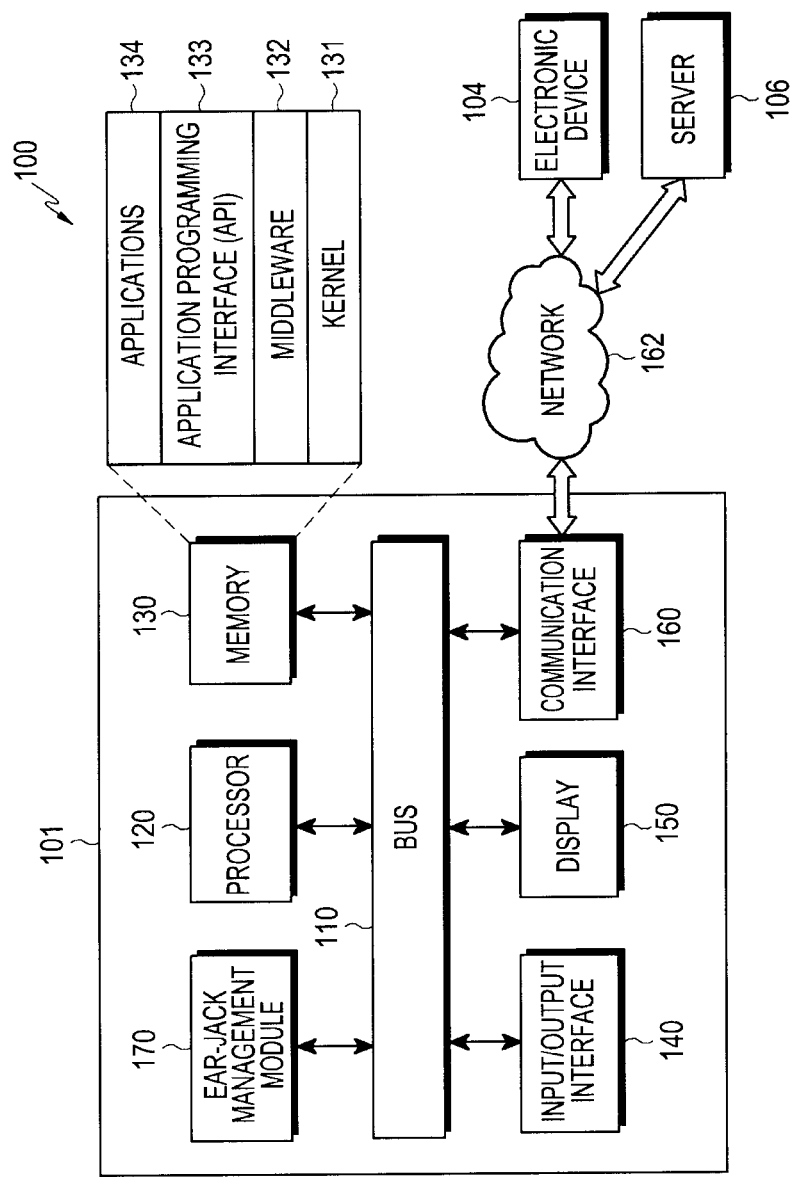
FIG. 1 is a block diagram of a network environment including an electronic device or an electronic device to which an electronic device controlling method is applicable according to various embodiments of the present disclosure.

Various embodiments of the present disclosure are described with reference to the attached drawings. As the present disclosure allows for various changes and numerous embodiments, particular embodiments will be illustrated in the drawings and described in detail. However, the present disclosure is not limited to the specific embodiments and should be construed as including all the changes, equivalents, and/or substitutions included in the spirit and scope of the present disclosure.

As used in various embodiments of the present disclosure, terms such as 'includes' or 'may include' refer to the presence of a disclosed corresponding function, operation, or component, and do not limit the presence of one or more additional functions, operations, or components. Also, terms such as 'includes' or 'has' refer to the presence of characteristics, numbers, steps, operations, components, parts, or combinations thereof, and are not intended to exclude one or more additional characteristics, numbers, steps, operations, components, parts or combinations thereof.

As used in various embodiments of the present disclosure, the term 'or' is used to include any and all combinations of terms listed. For example, 'A or B' includes only A, only B, or both A and B.

As used in various embodiments of the present disclosure, terms such as 'first' or 'second' may be used to describe various components, but do not limit such components. For example, the terms do not limit the order and/or the importance of their associated components. Such terms may be used to distinguish one component from another. For example, a first User Equipment (UE) and a second UE are both UEs, but are different UEs. For example, without departing from the scope of the present disclosure, a first component may be called a second component, and likewise, a second component may be called a first component.

If a component is said to be 'connected with' or 'connected to' another component, the component may be directly connected with, or connected to, the other component, or another component may exist in between. On the other hand, if a component is said to be 'directly connected with' or 'directly connected to' another component, it should be understood that no components exist in between.

Terms as used in various embodiments of the present disclosure are used to describe the specific embodiments of the present disclosure, and are not intended to limit the present disclosure. Singular terms are intended to include plural forms, unless the context makes it clear that plural forms are not intended.

Unless defined otherwise, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

An electronic device according to various embodiments of the present disclosure may be a device with communication capabilities. For example, the electronic device may be at least one of a smart phone, a tablet Personal Computer (PC), a mobile phone, a video phone, an e-Book reader, a desktop PC, a laptop PC, a Netbook computer, a Personal Digital Assistant (PDA), a Portable Multimedia Player (PMP), an MP3 player, a mobile medical equipment, a camera, and a wearable device (for example, a Head-Mounted Device (HMD) such as electronic glasses, electronic clothes, an electronic bracelet, an electronic necklace, an electronic Appcessory, an electronic tattoo, or a smart watch).

According to some embodiments, an electronic device may be a smart home appliance having communication functionality. The smart home appliance may be, for example, at least one of a Television (TV), a Digital Video Disk (DVD) player, an audio, a refrigerator, an air conditioner, a vacuum cleaner, an oven, a microwave oven, a washer, an air purifier, a set-top box, a TV box (for example, Samsung HomeSync™ Apple TV™, or Google TV™), a game console, an electronic dictionary, a camcorder, or an electronic picture frame.

According to some embodiments, an electronic device may be a medical device (for example, a Magnetic Resonance Angiography (MRA) device, a Magnetic Resonance Imaging (MRI) device, a Computed Tomography (CT) device, an imaging device, or a ultrasonic device), a navigation device, a Global Positioning System (GPS) receiver, an Event Data Recorder (EDR), a Flight Data Recorder (FDR), an automotive infotainment device, a naval electronic device (for example, a naval navigation device, a gyroscope, or a compass), an avionic electronic device, a security device, an in-vehicle head unit, an industrial or consumer robot, an Automatic Teller Machine (ATM) for a bank, or a Point of Sales (PoS) device for a shop.

According to some embodiments, an electronic device may be furniture, part of a building/structure, an electronic board, an electronic signature receiving device, a projector, or various measuring devices (for example, water, electricity, gas or electro-magnetic wave measuring devices), that include communication functionality. An electronic device according to various embodiments of the present disclosure may be any combination of the foregoing devices. In addition, an electronic device according to various embodiments of the present disclosure may be a flexible device. It will be apparent to one having ordinary skill in the art that an electronic device according to various embodiments of the present disclosure is not limited to the foregoing devices.

With reference to the attached drawings, an electronic device according to various embodiments of the present disclosure will be described below. The term used herein 'user' may refer to a person that uses an electronic device or a device (for example, an artificial intelligence electronic device) that uses an electronic device.

FIG. 1 is a block diagram of a network environment including an electronic device or an electronic device to which an electronic device controlling method is applicable according to various embodiments of the present disclosure.

Referring to FIG. 1, an electronic device 101 may include a bus 110, a processor 120, a memory 130, an Input/Output (I/O) interface 140, a display 150, a communication interface 160, and an ear-jack management module 170.

The bus 110 may be a circuit that connects the foregoing components and provides communication (for example, a control message) between the foregoing components.

The processor 120 may, for example, receive instructions from other components (for example, the memory 130, the I/O interface 140, the display 150, the communication interface 160, or the ear-jack management module 170), interpret the received instructions, and execute computation or data processing according to the interpreted instructions.

The memory 130 may, for example, store instructions or data that are received from, or generated by, other components (for example, the I/O interface 140, the display 150, the communication interface 160, or the ear-jack management module 170). For example, the memory 130 may include programming modules such as a kernel 131, a middleware 132, an Application Programming Interface (API) 133, or an application 134. Each of the foregoing programming modules may include software, firmware, hardware, or a combination of at least two of software, firmware or hardware.

The kernel 131 may control or manage system resources (for example, the bus 110, the processor 120, or the memory 130) that are used in executing operations or functions implemented in other programming modules, for example, the middleware 132, the API 133, or the application 134. Also, the kernel 131 may provide an interface for allowing the middleware 132, the API 133, or the application 134 to access individual components of the electronic device 101.

The middleware 132 may be a medium through which the kernel 131 may communicate with the API 133 or the application 134 to transmit and receive data. Also, the middleware 132 may perform a control operation (for example, scheduling or load balancing) in regard to work requests by one or more applications 134 by, for example, assigning priorities for using system resources (for example, the bus 110, the processor 120, or the memory 130) of the electronic device 101 to the one or more applications 134.

The API 133 is an interface that may control functions that the application 134 provides at the kernel 131 or the middleware 132. For example, the API 133 may include at least one interface or function (for example, a command) for file control, window control, video processing, or text control.

According to various embodiments, the application 134 may include a Short Message Service (SMS)/Media Messaging Service (MMS) application, an email application, a calendar application, an alarm application, a health care application (for example, an application that measures the amount of exercise or a blood sugar level), or an environment information application (for example, an application that provides information about an air pressure, a humidity level, or a temperature). Alternatively or additionally, the application 134 may be related to information exchange between the electronic device 101 and an external electronic device (for example, an electronic device 104). The information exchange-related application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 104). Alternatively or additionally, the notification relay application may receive notification information from the external electronic device (for example, the electronic device 104) and transmit the received notification information to a user. The device management application may manage (for example, install, delete, or update) at least a part of functions of the external electronic device (for example, the electronic device 104) communicating with the electronic device 101 (for example, turn-on/turn-off of the external electronic device (or a part of its components) or control of the brightness (or resolution) of the display), an application executed in the external electronic device, or a service (for example, a call service or a message service) provided by the external electronic device.

According to various embodiments, the application 134 may include an application designated according to a property (for example, the type of the electronic device) of the external electronic device (for example, the electronic device 104). For example, if the external electronic device is an MP3 player, the application 134 may include an application related to music play. If the external electronic device is a mobile medical device, the application 134 may include an application related to health care. According to an embodiment, the application 134 may include at least one of an application designated in the electronic device 101 or an application received from another electronic device (for example, a server 106 or the electronic device 104).

The I/O interface 140 may receive a command or data from a user through an I/O device (for example, a sensor, a keyboard, or a touch screen) to the processor 120, the memory 130, the communication interface 160, or the ear-jack management module 170, for example, through the bus 110. For example, the I/O interface 140 may provide data of a user touch received through the touch screen to the processor 120. Further, the I/O interface 140 may, for example, output a command or data received from the processor 120, the memory 130, the communication interface 160, or the ear-jack management module 170 through the bus 110 to the I/O device (for example, a speaker or a display). For example, the I/O interface 140 may output voice data processed by the processor 120 to a user through the speaker.

The display 150 may display various types of information (for example, multimedia data or text data) to the user.

The communication interface 160 may provide communication between the electronic device 101 and an external device (for example, the electronic device 104 or the server 106). For example, the communication interface 160 may be connected to a network 162 by wireless or wired communication and communicate with the external device over the network 162. The wireless communication may be conducted in conformance to, for example, at least one of Wireless Fidelity (WiFi), Bluetooth (BT), Near Field Communication (NFC), Global Positioning System (GPS), and cellular communication (for example, Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), or Global System for Mobile communications (GSM)). The wired communication may be conducted in conformance to, for example, at least one of Universal Serial Bus (USB), High Definition Multimedia Interface (HDMI), Recommended Standard 232 (RS-232), or Plain Old Telephone Service (POTS).

According to an embodiment, the network 162 may be a communication network, for example, at least one of a computer network, the Internet, the Internet of things, and a telephone network. According to an embodiment, at least one of the application 134, the API 133, the middleware 132, the kernel 131, or the communication interface 160 may support a protocol (for example, a transport layer protocol, a data link layer protocol, or a physical layer protocol) for communication between the electronic device 101 and an external device.

The ear-jack management module 170 may be configured to perform, for example, an operation for determining whether an ear-jack terminal cap has been inserted into an ear-jack terminal of the electronic device 101, an operation for, when the ear-jack terminal cap has been inserted into the ear-jack terminal of the electronic device 101, displaying button types controllable through the ear-jack terminal cap, and an operation for receiving a selection of at least one of the button types and upon receipt of a button input for the ear-jack terminal cap, executing a function corresponding to the selected button type.

Alternatively, the ear-jack management module 170 may be configured to perform, for example, an operation for determining whether the ear-jack terminal cap has been inserted into the ear-jack terminal of the electronic device 101, an operation for, when the ear-jack terminal cap has been inserted into the ear-jack terminal of the electronic device 101, determining whether the electronic device moves in correspondence to a specific gesture with a button provided on the ear-jack terminal cap pressed, and an operation for, when the movement of the electronic device corresponds to the gesture, executing a function corresponding to the gesture.

According to various embodiments, a function(s) or operation(s) of the ear-jack management module 170 may be implemented by, for example, the processor 120. A detailed description will be given of the ear-jack management module 170 later.

Figure 2:
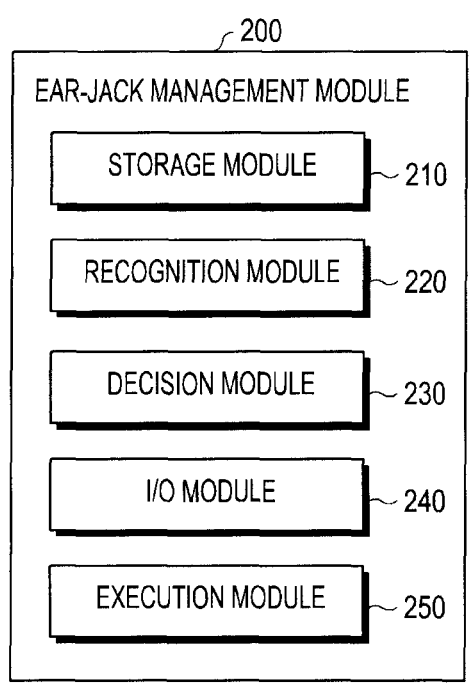
FIG. 2 is a block diagram of an ear-jack management module in an electronic device according to various embodiments of the present disclosure.

FIG. 2 is a block diagram of an ear-jack management module 200 in an electronic device (for example, the electronic device 101) according to various embodiments of the present disclosure. The ear-jack management module 200 may include a storage module 210, a recognition module 220, a decision module 230, an I/O module 240, and an execution module 250.

The storage module 210 may store information related to various elements (for example, a first resistor and a second resistor as will be described below with reference to FIG. 5) of an ear-jack terminal cap (for example, an ear-jack terminal cap 500 as will be described below with reference to FIG. 5). More specifically, the storage module 210 may store at least one of voltage value corresponding to at least one of resistance value of the first resistor (for example, an Analog to Digital Conversion (ADC) value corresponding to the resistance value of the first resistor) to determine whether the ear-jack terminal cap has been inserted and at least one of voltage value corresponding to at least one of resistance value of the second resistor (for example, an ADC value corresponding to the resistance value of the second resistor) to determine whether a button input has been received. For reference, an ADC value may be, for example, a digital value of a signal generated from the ear-jack terminal cap connected to an ear-jack terminal (for example, an ear-jack terminal 513 as will be described below with reference to FIG. 5). For example, an ADC value may refer to a voltage signal corresponding to a microphone activation key button of a predetermined earphone (not shown) or a voltage signal corresponding to a volume up/down key button. In addition to the ADC values, the storage module 210 may store various commands or data generated in the electronic device or the ear-jack terminal cap.

The recognition module 220 may be configured to recognize insertion of a predetermined plug into the ear-jack terminal of the electronic device. If the plug is inserted into the ear-jack terminal, a jack interrupt occurs and thus the recognition module 220 may determine whether the plug has been inserted into the ear-jack terminal based on the generated jack interrupt. The plug may include various object(s) that can be inserted into the ear-jack terminal, including the ear-jack terminal cap. The recognition module 220 may include an input terminal DETECT IN for sensing insertion of the plug in order to determine whether the plug has been connected.

The decision module 230 may be configured to determine whether the ear-jack terminal cap has been inserted into the ear-jack terminal of the electronic device, that is, whether the inserted plug is the ear-jack terminal cap. In other words, when the recognition module 220 senses insertion of the plug into the ear-jack terminal, the decision module 230 may determine whether the plug is the ear-jack terminal cap based on an ADC value corresponding to a resistance value of the first resistor. For example, if the ADC value corresponding to the resistance value of the first resistor is, for example, 1V, upon sensing the ADC value (for example, 1V) of the first resistor after insertion of the plug, the decision module 230 may determine that the ear-jack terminal cap has been inserted.

According to various embodiments of the present disclosure, the decision module 230 may be configured to determine whether the electronic device has moved in correspondence with a specific gesture, with a button provided on the ear-jack terminal cap pressed.

The I/O module 240 may be configured to transmit a command or data received from the user through an I/O device (for example, a keypad or a touch screen) to each component of the ear-jack management module 200. If the I/O module is implemented as, for example, a touch screen, the I/O module 240 may be configured to display button types (for example, button types 620) controllable by the ear-jack terminal cap and receive a selection of at least one of the button types.

The storage module 210 may be configured to store information about the selected button type. The execution module 250 may be configured to execute a function(s) or operation(s) corresponding to the button type, when the button is pressed. According to various embodiments of the present disclosure, if the movement of the electronic device corresponds to the gesture, the execution module 250 may be configured to execute a function corresponding to the gesture.

The decision module 230 may determine whether the button has been pressed. More specifically, the decision module 230 may determine whether the button has been pressed based on an ADC value corresponding to a composite resistance value of the first resistor and the second resistor (for example, the second resistor 502a). The button provided on the ear-jack terminal cap may be implemented in connection to a specific switch. The decision module 230 may compare the ADC value corresponding to the composite resistance value with ADC values stored in the storage module 210 and, in the presence of a matching ADC value, may determine that the button has been pressed.

According to an embodiment of the present disclosure, the ear-jack terminal cap may include a first resistor for determining whether the ear-jack terminal cap has been inserted and a second resistor for determining input of the button.

According to an embodiment of the present disclosure, it may be determined whether the ear-jack terminal cap has been inserted by comparing a voltage value corresponding to a resistance value of the first resistor with voltage values pre-stored in the electronic device.

According to an embodiment of the present disclosure, it may be determined whether the button of the ear-jack terminal cap has been input by measuring a voltage value applied to each of the first and second resistors according to a composite resistance value of the first and second resistors and comparing the voltage value applied to the second resistor with voltages pre-stored in the electronic device.

According to an embodiment of the present disclosure, both the first and second resistors may be fixed resistors. Or the first resistor may be a fixed resistor and the second resistor may be a variable resistor.

Figure 3A:
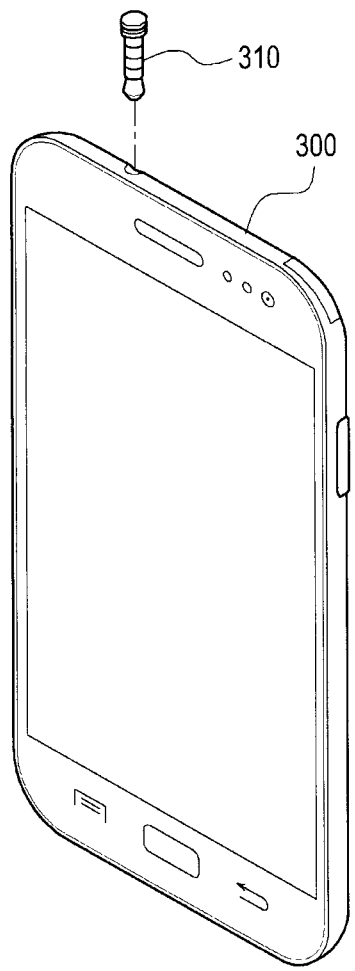
FIG. 3A and FIG. 3B are views illustrating an operation for inserting an ear-jack terminal cap according to various embodiments of the present disclosure into an electronic device according to various embodiments of the present disclosure.
Figure 3B:
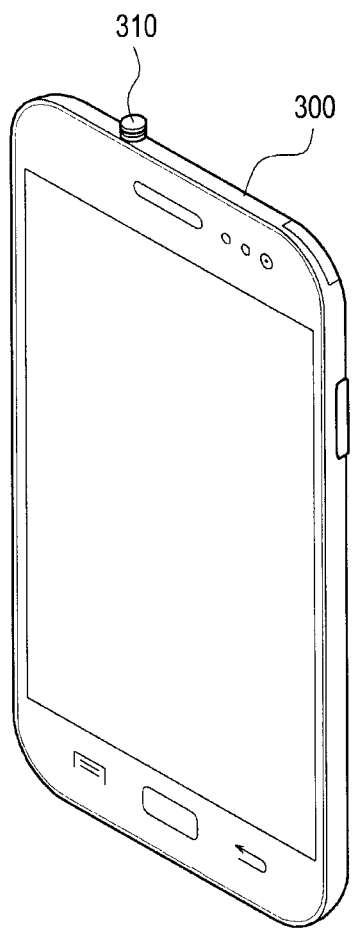

FIGS. 3A and 3B are views illustrating an operation for inserting an ear-jack terminal cap according to various embodiments of the present disclosure into an electronic device according to various embodiments of the present disclosure.

Referring to FIGS. 3A and 3B, an ear-jack terminal cap 310 according to various embodiments of the present disclosure may be inserted into an ear-jack terminal of an electronic device 300 according to various embodiments of the present disclosure.

Figure 4A:
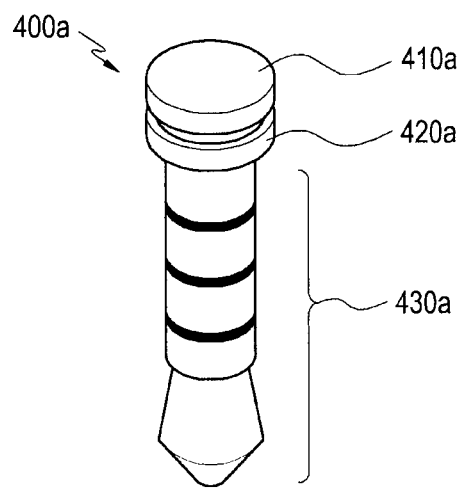
FIG. 4A and FIG. 4B illustrate shapes of an ear-jack terminal cap according to various embodiments of the present disclosure.
Figure 4B:
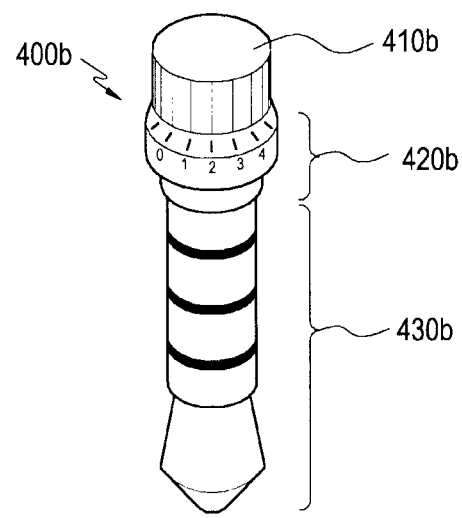

FIGS. 4A and 4B illustrate shapes of an ear-jack terminal cap according to various embodiments of the present disclosure.

Referring to FIG. 4A, an ear-jack terminal cap 400a according to an embodiment of the present disclosure may include a button portion 410a, a fixing portion 420a, and the ear-jack insertion portion 430a.

The button portion 410a may be implemented as a control means for the electronic device (for example, an electronic device 510). More specifically, when the button portion 410a is pressed, various functions(s) or operation(s) set by a user may be performed, which will be described later.

The fixing portion 420a may support the ear-jack terminal cap 400a so as to keep the ear-jack terminal cap 400a inserted into the electronic device.

The ear-jack insertion portion 430a may be inserted into the electronic device and thus electrically connected to the electronic device, as illustrated in FIG. 3B.

Referring to FIG. 4B, an ear-jack terminal cap 400b according to another embodiment of the present disclosure may include a rotation portion 410b, a fixing portion 420b, and the ear-jack insertion portion 430b.

The rotation portion 410b may perform a function or operation similar to that of the button portion 410a. That is, when the user applies an input to the rotation portion 410b, a functions(s) or operation(s) corresponding to the input may be performed. One thing to note herein is that the aforedescribed second resistor may be configured as a variable resistor in the ear-jack terminal cap 400b according to this embodiment. The electronic device may perform a continuous control operation such as volume control by measuring a voltage variation applied to the second resistor according to a changed resistance value.

A description of the fixing portion 420b and the ear-jack insertion portion 430b is pursuant to the description of the ear-jack terminal cap 400a and thus will not be provided herein.

Figure 5A:
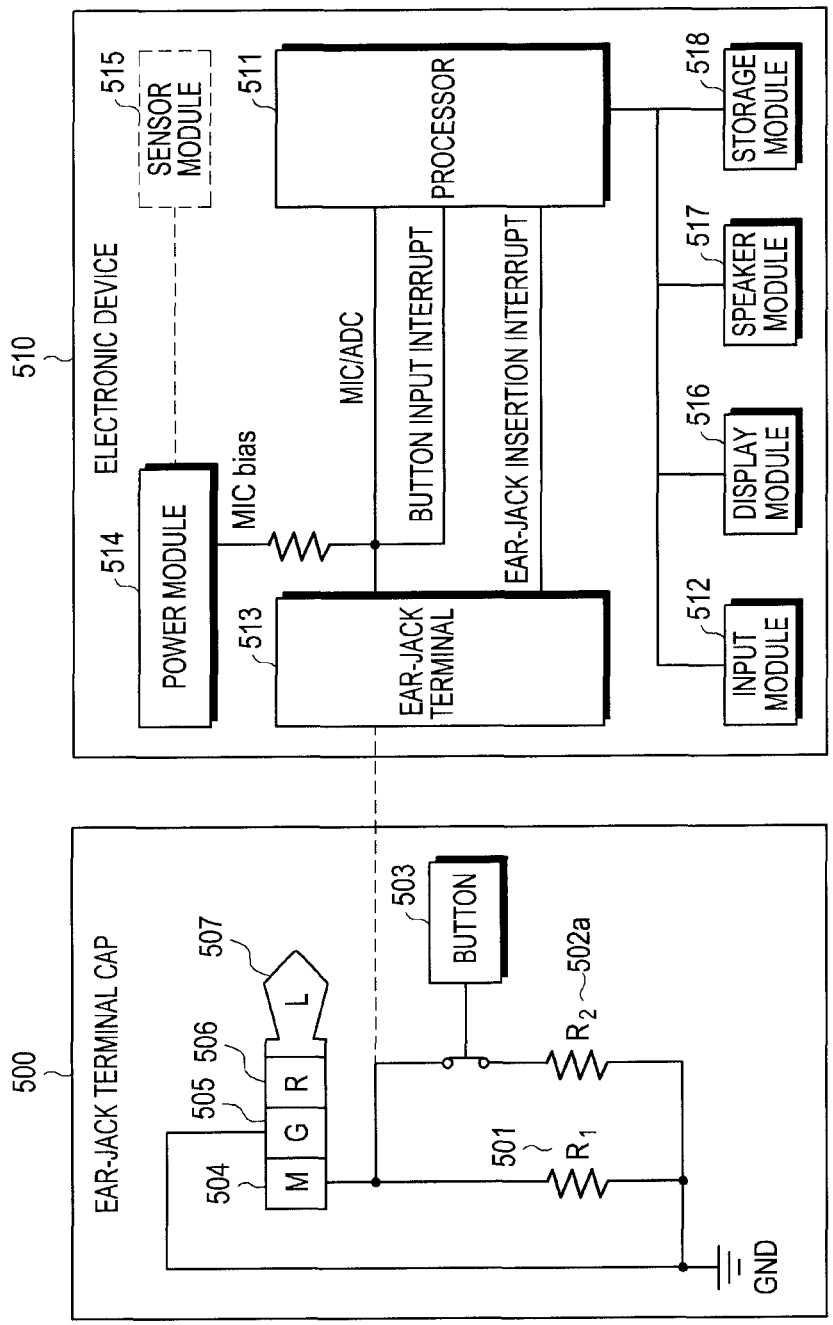
FIG. 5A and FIG. 5B illustrate the structures of an electronic device and ear-jack terminal cap according to various embodiments of the present disclosure.
Figure 5B:
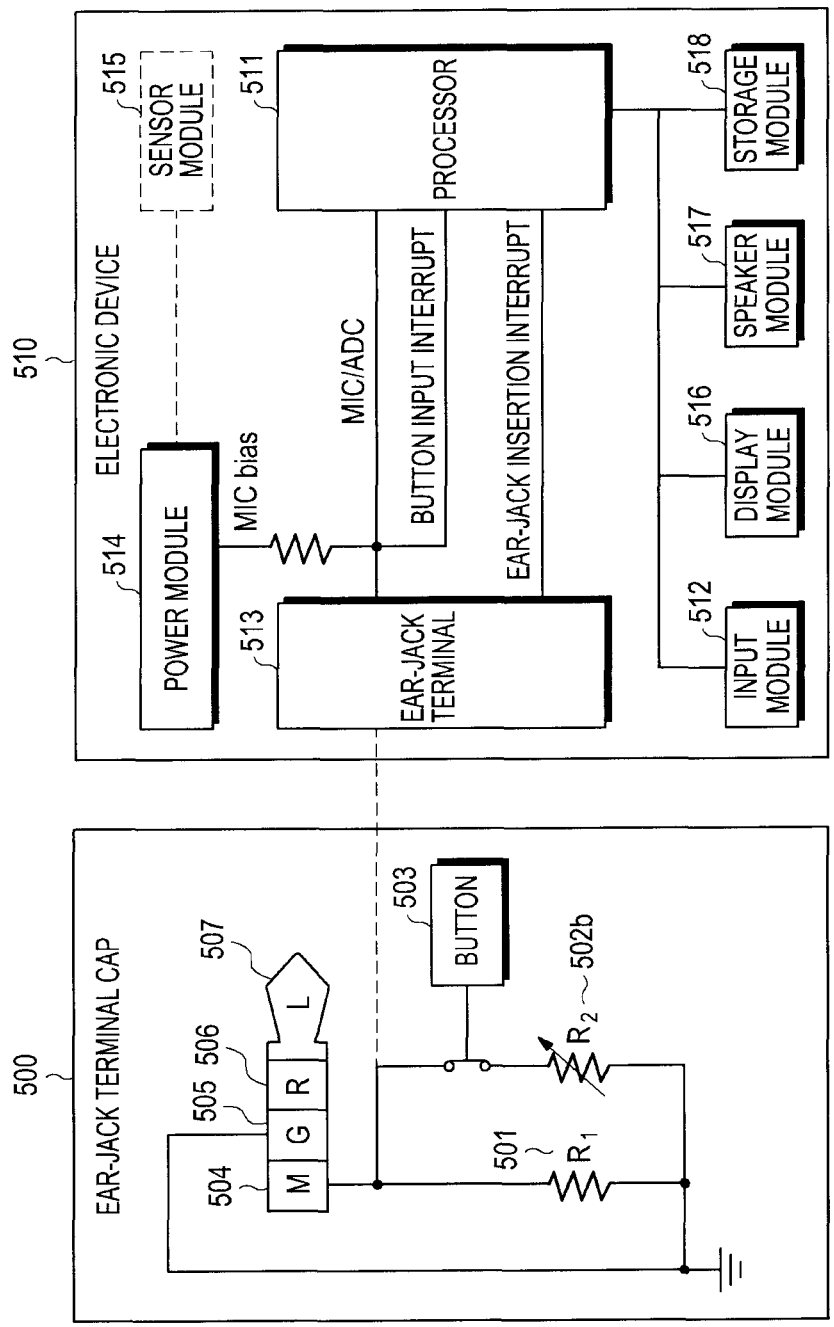

FIGS. 5A and 5B illustrate the structures of an electronic device and ear-jack terminal cap according to various embodiments of the present disclosure.

FIG. 5A is a view of an ear-jack terminal cap 500 according to an embodiment of the present disclosure, described with reference to FIG. 4A. Referring to FIG. 5A, the ear-jack terminal cap 500 according to the embodiment of the present disclosure may include the first resistor 501 and the second resistor 502a, as described before. The second resistor 502a may be a fixed resistor that has an invariable resistance, unlike a variable resistor. The first resistor 501 may be used to determine whether the ear-jack terminal cap 500 has been inserted. The second resistor 502a may be used to determine whether a button 503 has been pressed. The first resistor 501 and the second resistor 502a may be shunt resistors according to an embodiment of the present disclosure.

For the convenience of description, an ear-jack insertion portion (for example, an ear-jack insertion portion 430a or 430b) of the ear-jack terminal cap includes a 4-pole ear-jack, that is, MIC (M, 504), GND (G, 505), RIGHT (R, 506), and LEFT (L, 507), by way of example. MIC (M, 540) may be a channel for executing a function(s) or operation(s) related to an external microphone or button connected electrically to the 4-pole ear-jack. GND (G, 505) may be a channel for grounding. RIGHT (R, 506) may be a right audio channel of an earphone including the 4-pole ear-jack. LEFT (L, 507) may be a left audio channel of the earphone including the 4-pole ear-jack. The first and second resistors may be preferably shunt resistors.

The first resistor 501 may be connected to the M 504. The second resistor 502a may be connected to the first resistor 501 in parallel. The button 503 may be connected to a switch. The switch may be turned on/off depending on whether the button 503 has been pressed. If the switch turns on, that is, the button 503 is pressed, a processor 511 of the electronic device 510 may measure a composite resistance value of the first resistor 501 and the second resistor 502a.

A storage module 518 of the electronic device 510 may pre-store at least one of the ADC value corresponding to the measurement composite resistance value. "A voltage value corresponding to a resistance value" may mean a voltage value applied to a specific resistor according to a resistance value of the specific resistor. Further, the storage module 518 may pre-store resistance value of the first and second resistors 501 and 502a. ADC value (for example, voltage value) corresponding to the resistance value of the first resistor 501 and the composite resistance value may be pre-stored in the storage module 518. The processor 511 may measure an ADC value corresponding to the resistance value of the first resistor 501 and compare the measured ADC value with a pre-stored ADC value. If the ADC values are equal or different within a predetermined range, the processor 511 may determine that the ear-jack terminal cap 500 has been inserted. The resistance value of the first resistor 501 may be unique to the ear-jack terminal cap 500. The first resistor 501 may have different resistance values in ear-jack terminal caps (for example, 400a and 400b) according to different embodiments of the present disclosure.

An input module 512 may be configured to receive setting information such as a user input for selecting a button type.

A power module 514 may be configured to supply power to each component of the electronic device 510.

A sensor module 515 may include various sensors such as a gyro sensor, a gravity sensor, and a proximity sensor. According to an embodiment, the sensor module 151 may not be provided.

A display module 516 may be configured preferably as a touch screen and may be configured to display various types of information.

A speaker module 517 may output auditory information under the control of the processor 511.

FIG. 5B is a view of the ear-jack terminal cap 500 according to another embodiment of the present disclosure, described with reference to FIG. 4B. Referring to FIG. 5B, the ear-jack terminal cap 500 according to the embodiment of the present disclosure may include the first resistor 501 and a second resistor 502b, as described before. The second resistor 502b may be a variable resistor that has a changing resistance value according to a predetermined condition, unlike a fixing resistor. The storage module 518 may pre-store at least one of the ADC value corresponding to at least one of the resistance value available to the variable resistor. The processor 511 may be configured to perform various function(s) or operation(s) set by a user based on an ADC change generated along with rotation of the rotation portion.

The other components illustrated in FIG. 5B operate in the same manner as their counterparts illustrated in FIG. 5A and thus will not be described in detail herein.

FIGS. 6A to 6F are views referred to for describing an operation for providing available button types to a user in a notification window and selecting a button type by the user, when an ear-jack terminal cap is inserted into an ear-jack terminal of an electronic device according to various embodiments of the present disclosure.

Figure 6A:
FIG. 6A, FIG. 6B, FIG. 6C, FIG. 6D, FIG. 6E and FIG. 6F are views referred to for describing an operation for providing available button types to a user in a notification window and selecting a button type by the user, when an ear-jack terminal cap is inserted into an ear-jack terminal of an electronic device according to various embodiments of the present disclosure.
Figure 6B:
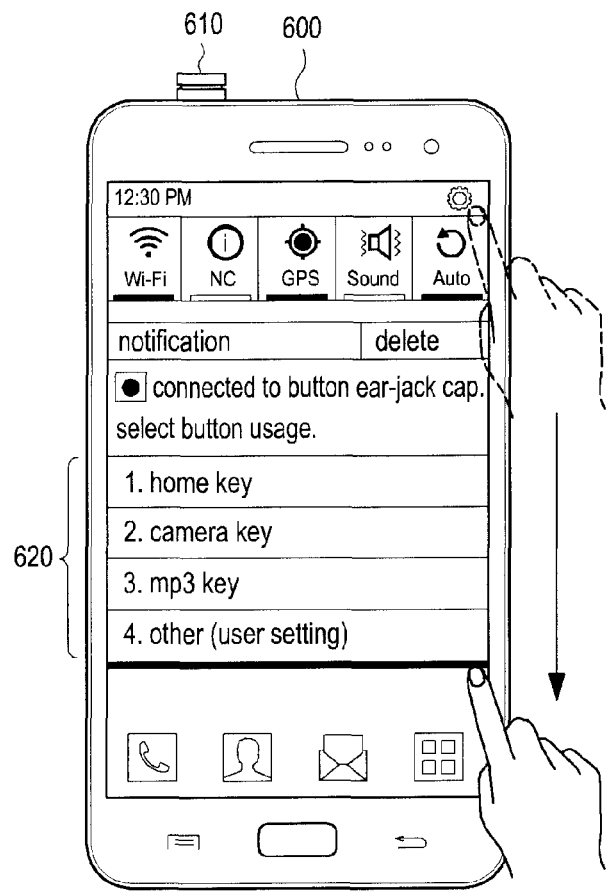
Figures 6C, 6D:
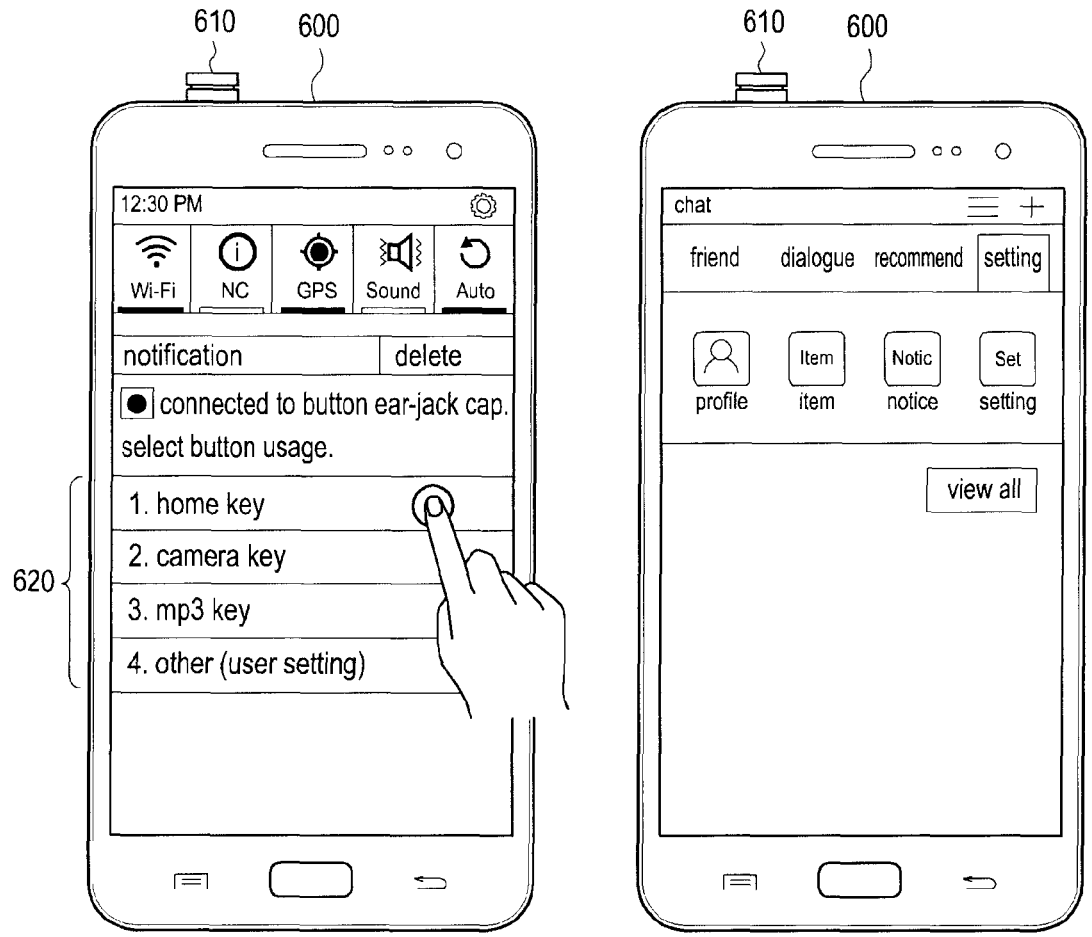
Figure 6E:
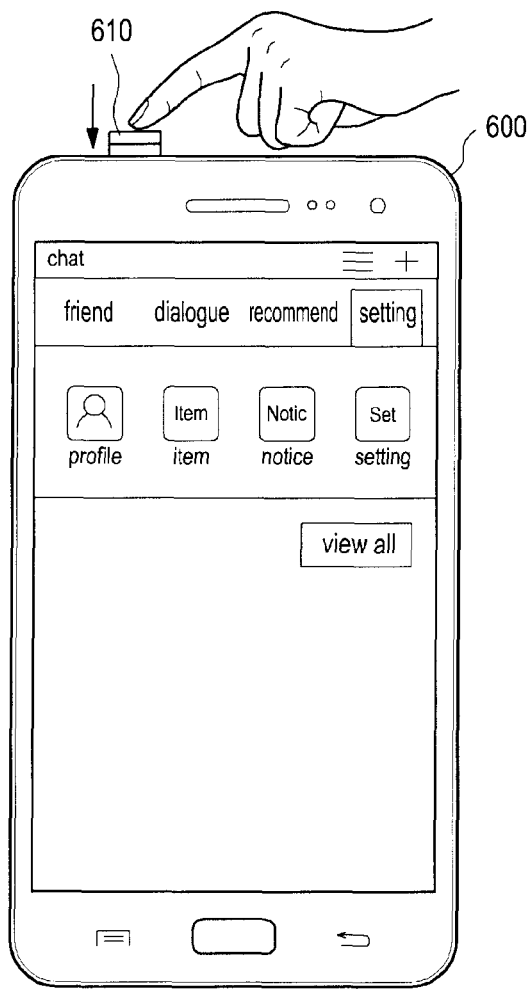

Referring to FIGS. 6A and 6B, an ear-jack terminal cap 610 may be inserted into an electronic device 600 and a user may select a button type 620 in a notification window. Button types 620 may refer to a function(s) or operation(s) that are executed when the user presses a button. The button type 620 may include, for example, a home key, a camera key, an MP3 key, and the like. The MP3 key is a key related to play of a sound file such as a music file. For example, the MP3 key may play a music file and switch to a next music. The button types 620 illustrated in FIG. 6B are exemplary. Thus, an Internet browsing key (for example, button pressing triggers an Internet browser), a call key (for example, button pressing triggers call connection), and the like other than the button types 620 illustrated in FIG. 6B may be included.

Figure 6F:

Referring to FIGS. 6C to 6F, the user may select a home key as an intended button type 620. Upon sensing pressing of a button during display of a screen (for example, a chatting application screen) other than a home screen, a processor (not shown) may control switching to the home screen according to the user-set 'home key', as illustrated in FIG. 6F.

FIGS. 7A to 7G are views referred to for describing an operation for providing available button types to a user through an application and selecting a button type by the user, when an ear-jack terminal cap is inserted into an ear-jack terminal of an electronic device according to various embodiments of the present disclosure.

Figure 7A:
FIG. 7A, FIG. 7B, FIG. 7C, FIG. 7D, FIG. 7E, FIG. 7F and FIG. 7G are views referred to for describing an operation for providing available button types to a user through an application and selecting a button type by the user, when an ear-jack terminal cap is inserted into an ear-jack terminal of an electronic device according to various embodiments of the present disclosure.
Figure 7B:
Figure 7C:
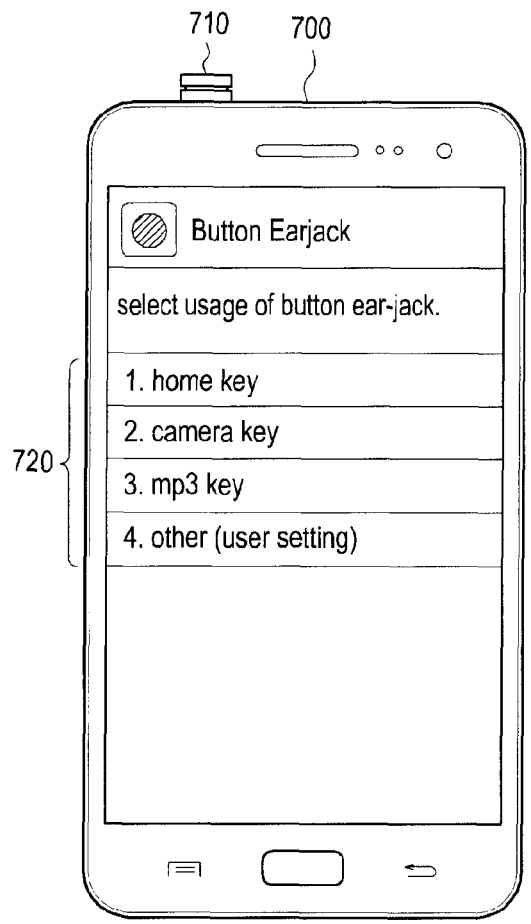
Figure 7D:
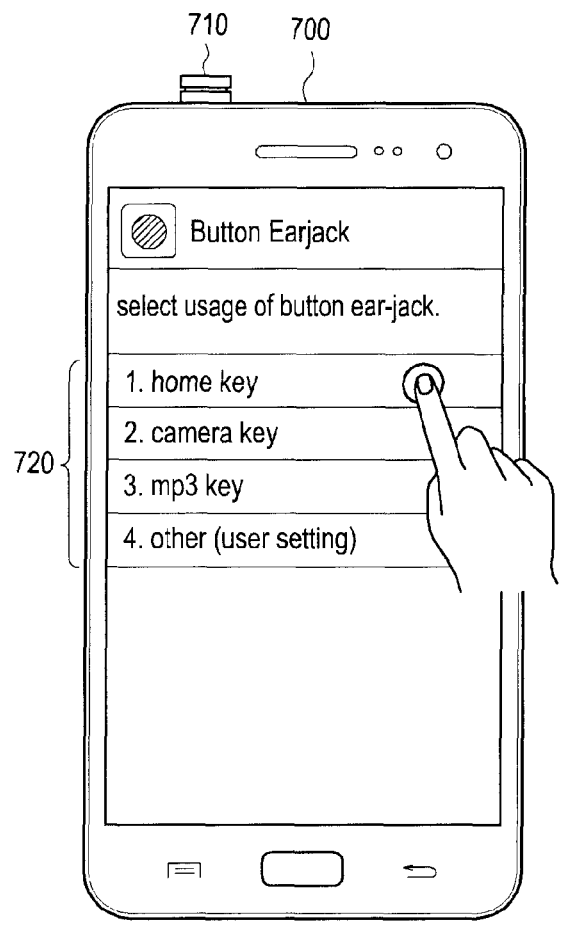
Figure 7E:
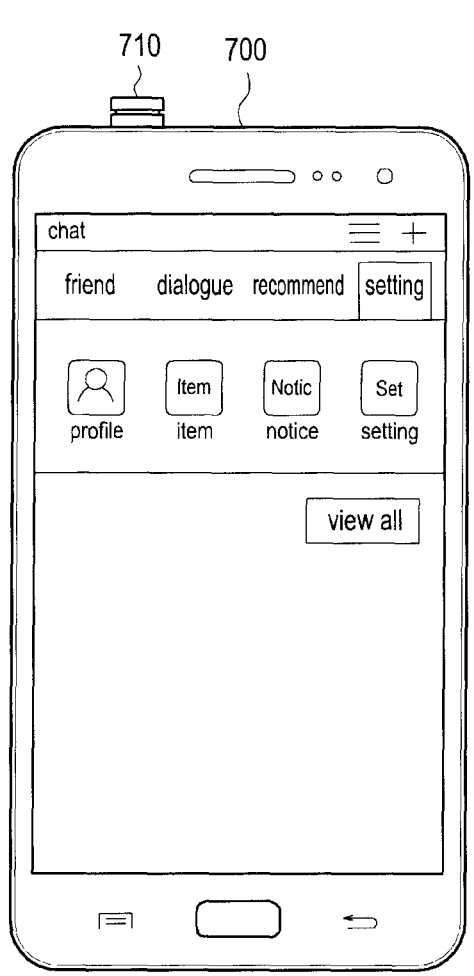
Figure 7F:
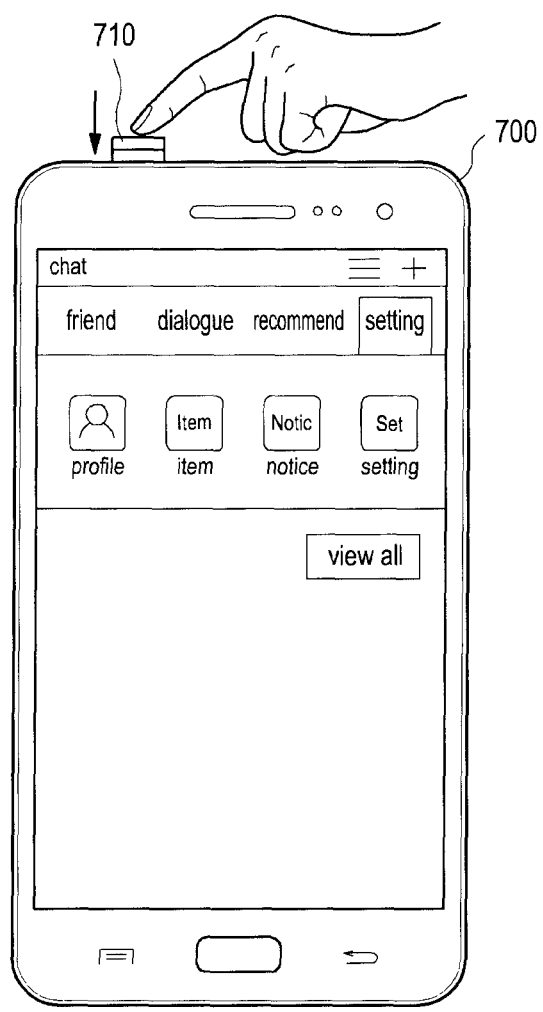
Figure 7G:

Referring to FIGS. 7A to 7G, compared to the embodiment illustrated in FIGS. 6A to 6F, a user selects a button type 720 by an ear-jack application 702 instead of a notification window. The user may select the ear-jack application 702 to select a button type 702. Upon selection of the ear-jack application 702, the processor (not shown) may control display of available button types 720 as illustrated in FIG. 7C.

In regard to the other part of the embodiment of FIGS. 7A to 7G, it may be implemented in the same manner as the embodiment of FIGS. 6A to 6F and thus will not be described in detail herein.

FIGS. 8A to 8E are views referred to for describing an operation for controlling an electronic device through an ear-jack terminal cap according to various embodiments of the present disclosure.

Figure 8A:
FIG. 8A, FIG. 8B, FIG. 8C, FIG. 8D, and FIG. 8E are views referred to for describing an operation for controlling an electronic device through an ear-jack terminal cap according to various embodiments of the present disclosure.
Figure 8B:
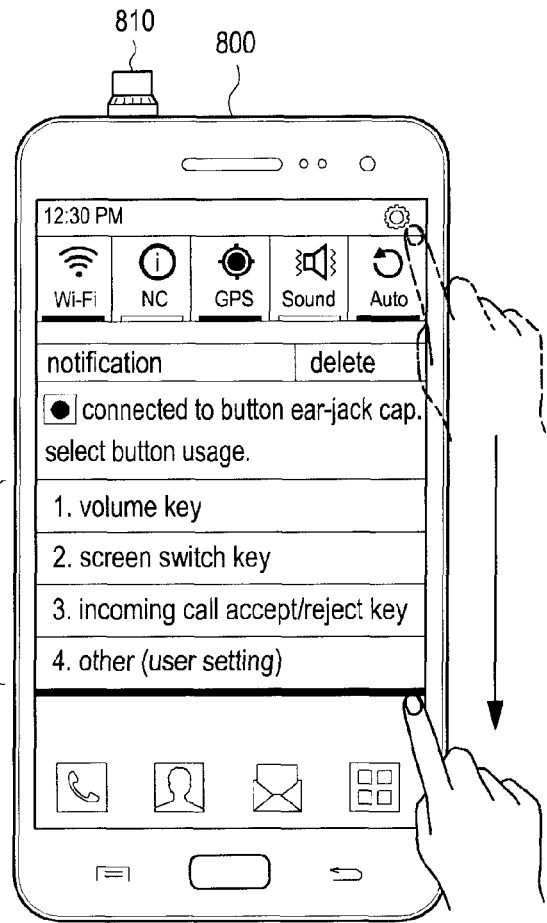
Figure 8C:
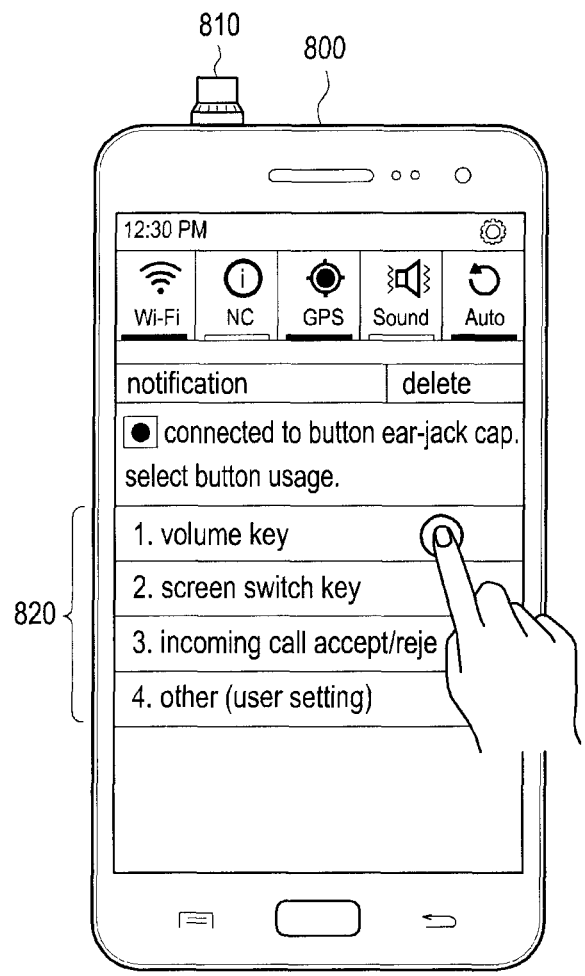

Referring to FIG. 8A, an ear-jack terminal cap 810 according to another embodiment of the present disclosure may be inserted into an electronic device 800. Upon insertion of the ear-jack terminal cap 810, a processor (not shown) may control display of available button types 820 as illustrated in FIGS. 8B and 8C. While FIGS. 8B and 8C illustrate only a volume key, a screen switch key, an incoming call accept/reject key, and a user setting key as available button types 820, they are purely exemplary. Thus, the button types 820 may include an image viewer key (for example, upon right rotation of the ear-jack terminal cap 801, a next image is displayed and upon left rotation of the ear-jack terminal cap 801, a previous image is displayed, during an operation of an image viewer application), and a screen lock/unlock key (for example, a screen is locked or unlocked according to a user-preset pattern (for example, one right rotation after two left rotations).

Figure 8D:
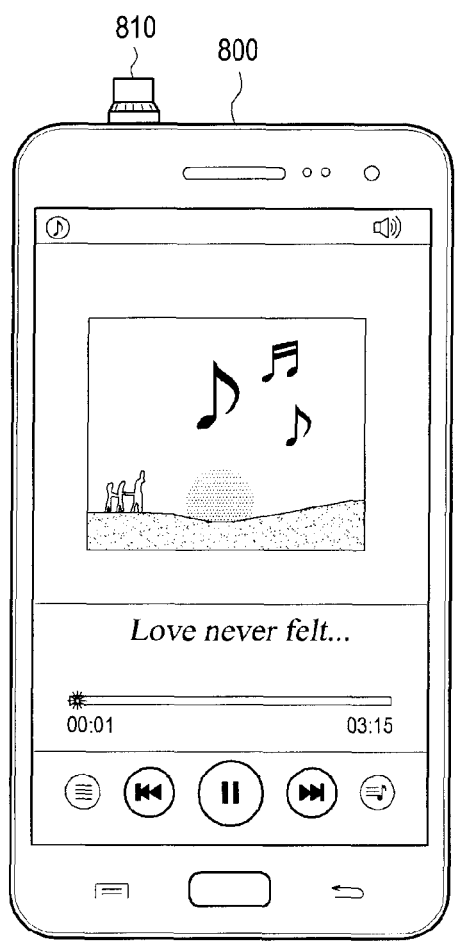
Figure 8E:
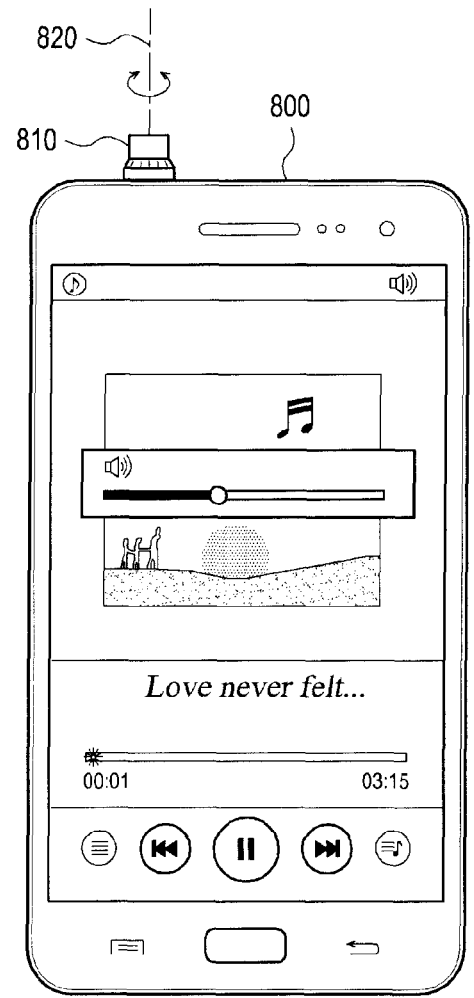

Referring to FIGS. 8C to 8E, in the case where a 'volume key' has been selected as an intended button type 820, upon rotation of a button during play of a music file, the processor (not shown) may execute a volume control function or operation corresponding to the button rotation.

While FIGS. 8A to 8E illustrate an embodiment of selecting a button type in the 'notification window', the button type may be selected by an application (for example, the ear-jack application 702).

Figure 9:
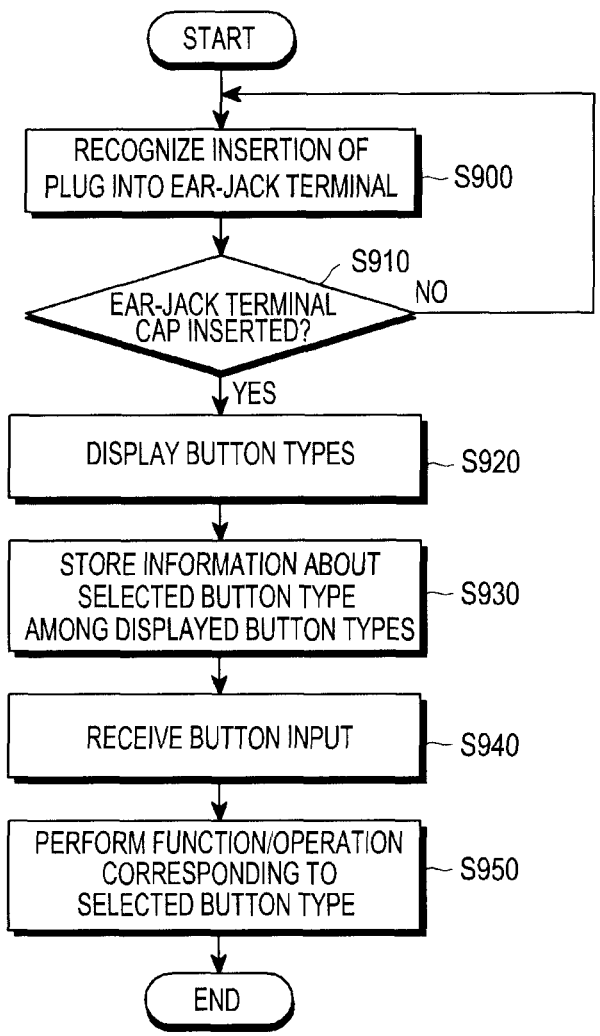
FIG. 9 is a flowchart illustrating a method for controlling an electronic device according to various embodiments of the present disclosure.

FIG. 9 is a flowchart illustrating a method for controlling an electronic device according to various embodiments of the present disclosure.

Referring to FIG. 9, the electronic device (for example, the electronic device 510) may recognize insertion of a plug into an ear-jack terminal (S900). Then the electronic device may determine whether the plug is an ear-jack terminal cap (for example, the ear-jack terminal cap 500), that is, the ear-jack terminal cap has been inserted (S910). If the electronic device determines that the ear-jack terminal cap has been inserted, the electronic device may display available button types (S920). Upon selection of at least one of the displayed button types, the electronic device may store information about the selected at least one button type (for example, the 'home key') in order to perform a function or operation corresponding to pressing (or rotation) of a button (S930). Upon receipt of an input of the button (for example, when the button is pressed or rotated) (S940), the electronic device may perform a function or operation corresponding to the selected button type (S950).

The foregoing description of an electronic device according to various embodiments of the present disclosure is applied to the method for controlling an electronic device according to various embodiments of the present disclosure described above with reference to FIG. 9. Therefore, a detailed description of the method for controlling an electronic device according to various embodiments of the present disclosure will not be provided herein.

Figure 10A:
FIG. 10A, FIG. 10B, and FIG. 10C are views referred to for describing an operation for controlling an electronic device using an ear-jack terminal cap and a sensor module of the electronic device in combination according to various embodiments of the present disclosure.
Figure 10B:
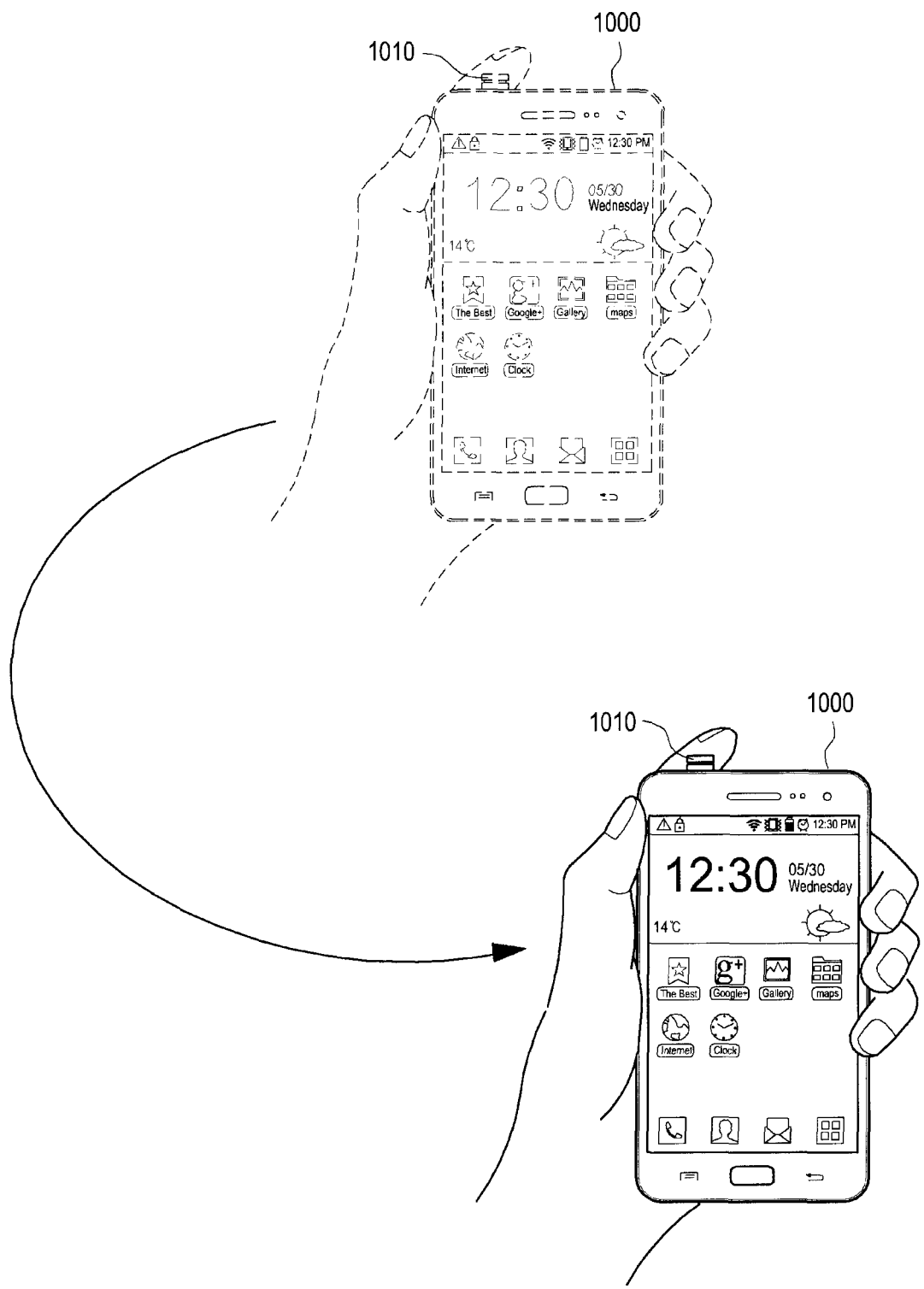
Figure 10C:
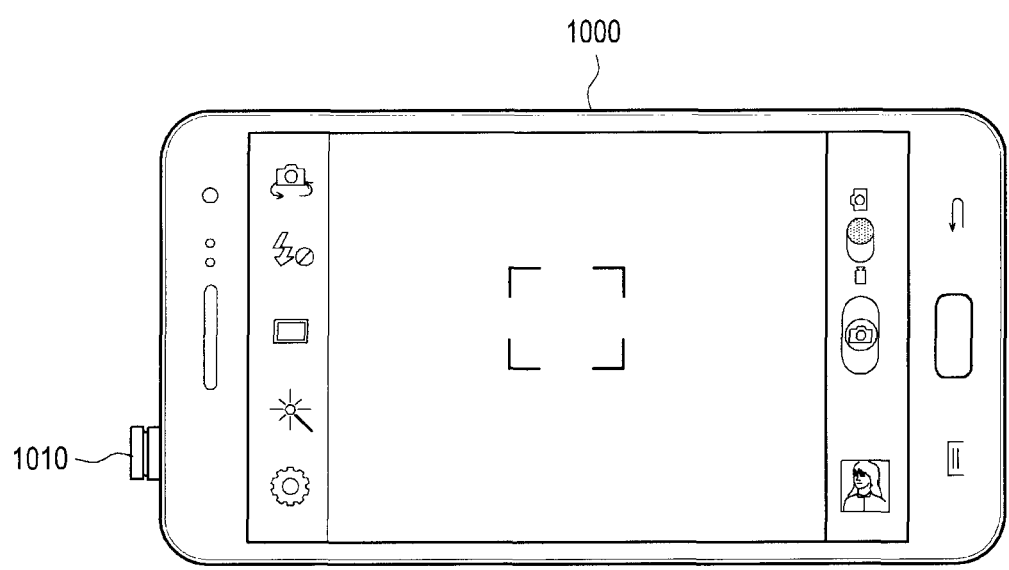

FIGS. 10A, 10B, and 10C are views referred to for describing an operation for controlling an electronic device using an ear-jack terminal cap and a sensor module of the electronic device in combination according to various embodiments of the present disclosure.

An electronic device 1000 according to various embodiments of the present disclosure may include a sensor module having a gyro sensor and a gravity sensor, as described before. While an ear-jack terminal cap 1010 is inserted in the electronic device 1000 as illustrated in FIG. 10A, if a user moves the electronic device 1000 by a specific gesture (for example, a gesture shaped like 'C'), pressing the ear-jack terminal cap 1010 as illustrated in FIG. 10B, a processor (not shown) may control execution of a function or operation corresponding to the gesture (for example, execution of a camera application). The function or operation corresponding to the gesture may be preset or set by a user as described before with reference to FIG. 6C. The specific gesture may be preset or set by directly inputting a specific character by the user.

The sensor module (for example, the gyro sensor and the gravity sensor) may sense the movement of the electronic device 1000. The processor may determine whether the gesture associated with the movement of the electronic device 1000 sensed by the sensor module is a preset gesture or a user-set gesture. If the gestures match, the processor may control execution of a function or operation corresponding to the gesture (for example, execution of a camera application corresponding to 'C').

The gesture (in the shape of 'C') is purely exemplary for description of the present disclosure. Various characters may be set as gestures according to various embodiments of the present disclosure. In addition, the function or operation corresponding to the gesture (execution of a camera application) is given as an example for description of the present disclosure. Thus, various functions or operations including play of an MP3 player and unlocking may be included in the functions or operations corresponding to the gesture.

Figure 10D:
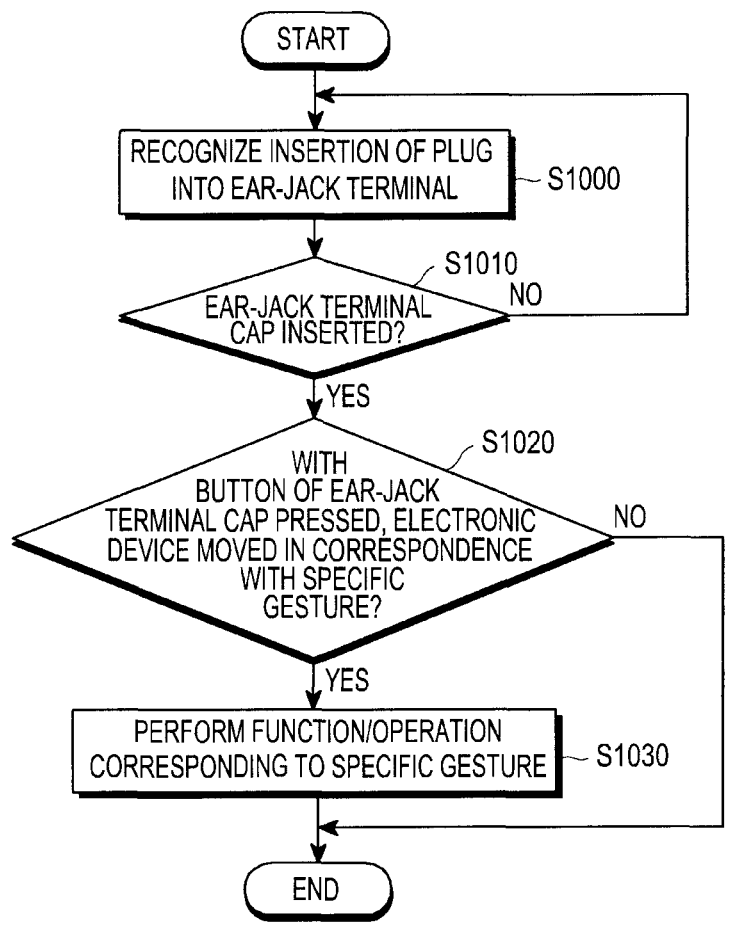
FIG. 10D is a flowchart illustrating the operation illustrated in FIGS. 10A, 10B, and 10C.

FIG. 10D is a flowchart illustrating the operation illustrated in FIGS. 10A, 10B, and 10C.

Referring to FIG. 10D, the electronic device 1000 may recognize insertion of a plug into the ear-jack terminal (S1000). Then, the electronic device 1000 may determine whether the plug is the ear-jack terminal cap 1010 (S1010). If the electronic device 1000 determines that the ear-jack terminal cap 1010 has been inserted, the electronic device 1000 may determine whether it is moved in correspondence with a specific gesture, with the button of the ear-jack terminal cap 1010 pressed (S1020). If the electronic device 1000 determines that it is moved in correspondence with the specific gesture, the electronic device 1000 may perform a function or operation corresponding to the specific gesture (S1030).

FIG. 10D may be pursuant to the description of FIGS. 10A, 10B, and 10C and thus will not further be described herein.

Figure 11:
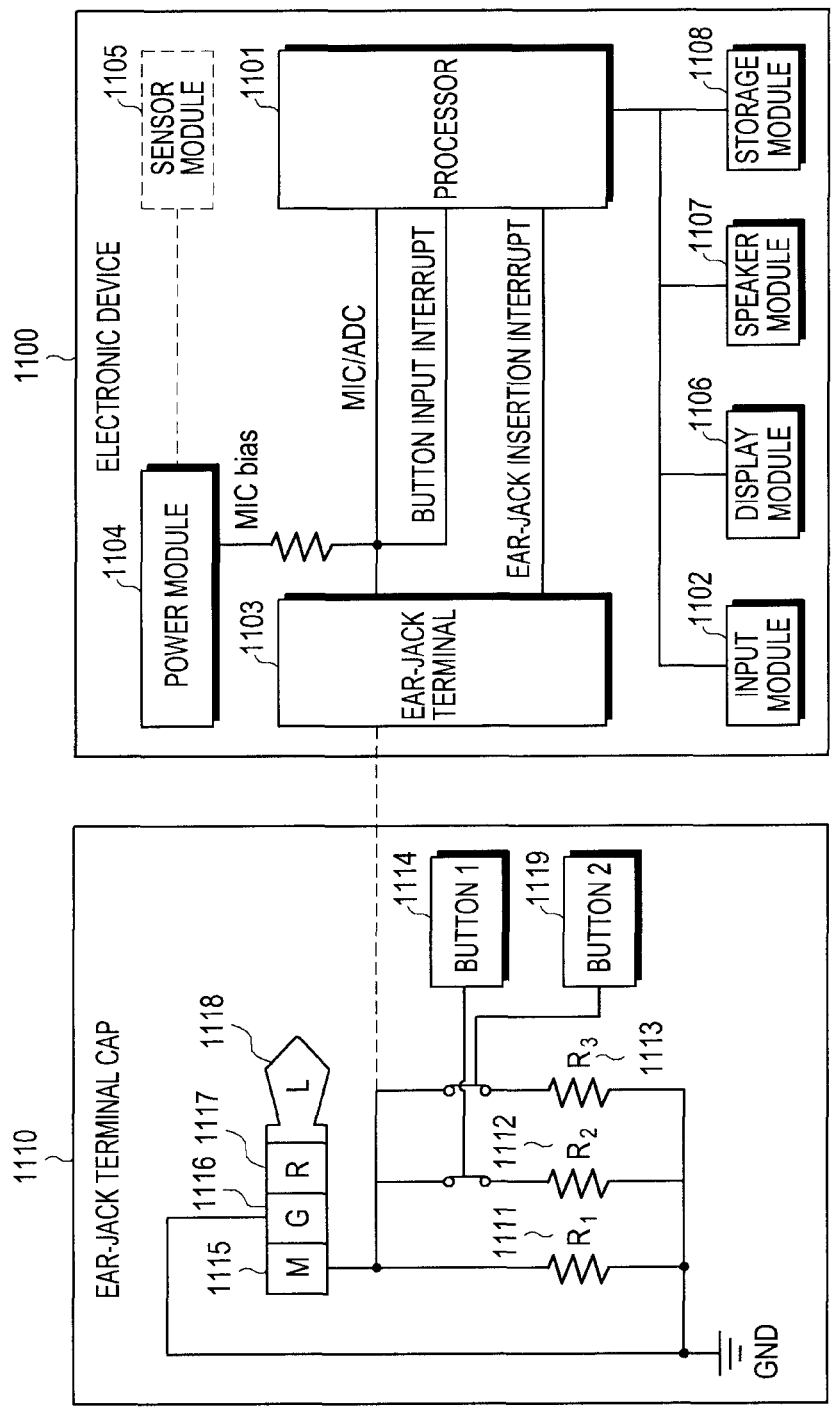
FIG. 11 is a view referred to for describing the structures of an electronic device and an ear-jack terminal cap that allow for selection of a plurality of button types.

FIG. 11 is a view referred to for describing the structures of an electronic device and an ear-jack terminal cap that allow for selection of a plurality of button types.

Referring to FIG. 11, an ear-jack terminal cap 1110 according to another embodiment of the present disclosure may include a plurality of second resistors 1112 and 1113 corresponding to button inputs. While it has been described that the above-described ear-jack terminal cap (for example, the ear-jack terminal cap 500) according to an embodiment of the present disclosure allows for selection of a single button type only, if a plurality of second resistors are provided as illustrated in FIG. 11, a button type corresponding to each of the second resistors may be available to a user.

For this purpose, the ear-jack terminal cap 1110 may include a plurality of buttons 1114 and 1119 corresponding to the second resistors 1112 and 1113. Therefore, a storage module 1108 may store ADC value corresponding to resistance value of the respective second resistors 1112 and 1113. A 'home key' may be set as a button type for the first button 1114 and a 'camera key' may be set as a button type for the second button 1119 according to user inputs. Upon receipt of an input for the first button 1114, a processor 1101 may control execution of a function or operation corresponding to the 'home key'. Upon receipt of an input for the second button 1119, the processor 1101 may control execution of a function or operation corresponding to the 'camera key'.

The other part of the structures illustrated in FIG. 11 may be pursuant to the description of FIG. 5A and thus will not be further described herein.

Figure 12:
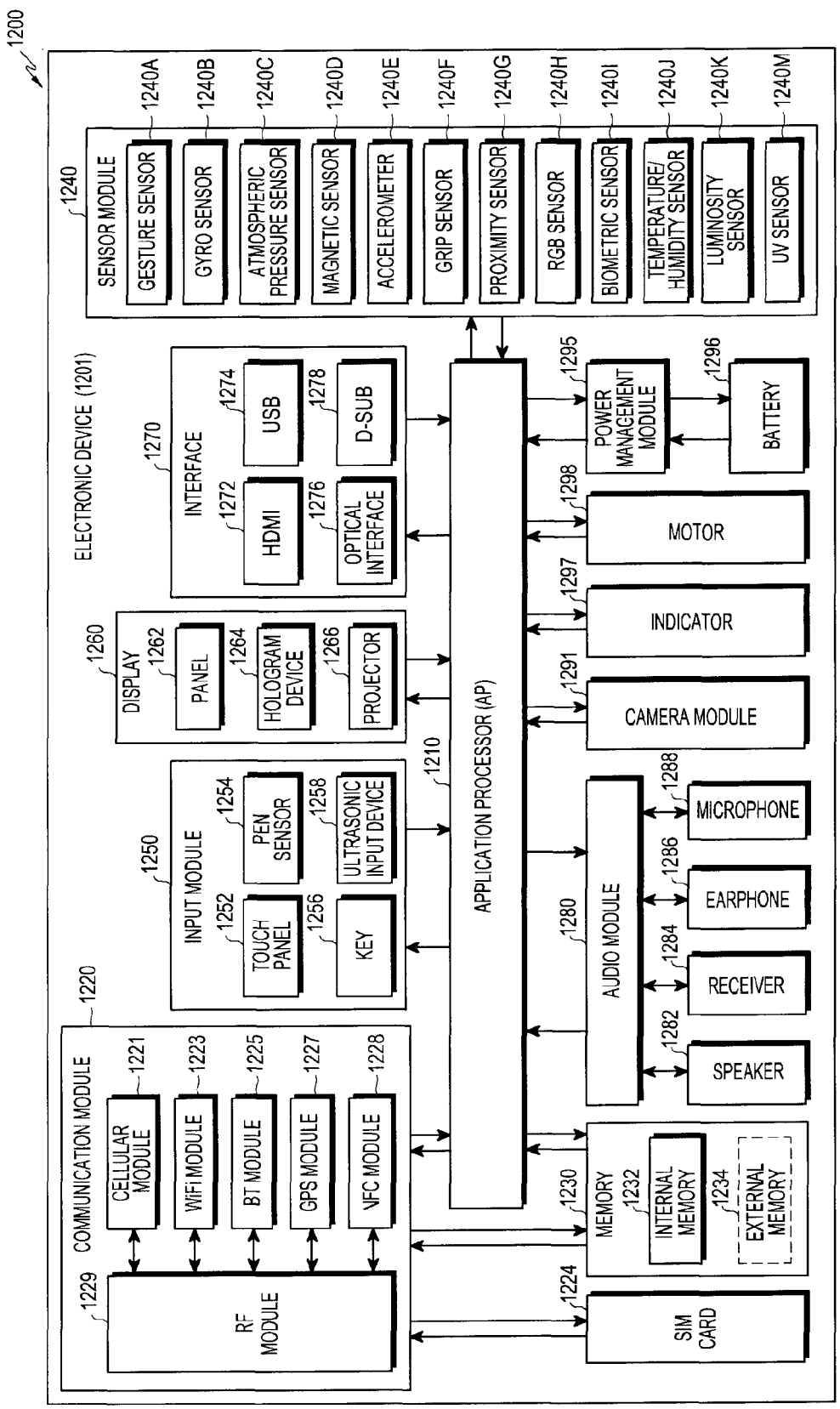
FIG. 12 is a block diagram of an electronic device or an electronic device to which an electronic device controlling method is applicable according to various embodiments of the present disclosure.

FIG. 12 is a block diagram of an electronic device or an electronic device to which an electronic device controlling method is applicable according to various embodiments of the present disclosure.

An electronic device 1200 may be, for example, a whole or a part of the electronic device 101 illustrated in FIG. 1. Referring to FIG. 12, the electronic device 1200 may include one or more Application Processors (APs) 1210, a communication module 1220, a Subscriber Identification Module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 may control one or more hardware or software components that are connected to the AP 1210 by executing an Operating System (OS) or an application program and may perform processing or computation of various types of data including multimedia data. The AP 1210 may be implemented, for example, as a System-on-Chip (SoC). According to an embodiment, the AP 1210 may further include a Graphics Processing Unit (GPU; not shown).

The communication module 1220 (for example, the communication interface 160) may transmit and receive data in communication between the electronic device 1200 (for example, the electronic device 101) and other electronic devices (for example, the electronic device 104 or the server 106). According to an embodiment, the communication module 1220 may include a cellular module 1221, a WiFi module 1223, a BT module 1225, a GPS module 1227, an NFC module 1228, and a Radio Frequency (RF) module 1229.

The cellular module 1221 may provide services such as voice call, video call, SMS, or the Internet, via a communication network (for example, LTE, LTE-A, CDMA, WCDMA, UMTS, WiBro, or GSM). The cellular module 1221 may identify and authenticate electronic devices within a communication network, using a SIM card (for example, the SIM card 1224). According to an embodiment, the cellular module 1221 may perform at least a part of the functionalities of the AP 1210. For example, the cellular module 1221 may perform at least a part of multimedia control functionality.

According to an embodiment, the cellular module 1221 may include a Communication Processor (CP). The cellular module 1221 may, for example, be implemented as an SoC. Although components such as the cellular module 1221 (for example, the CP), the memory 1230, or the power management module 1295 are shown in FIG. 12 as configured separately from the AP 1210, the AP 1210 may include, or be integrated with, one or more of the foregoing components (for example, the cellular module 1221).

According to an embodiment, the AP 1210 or the cellular module 1221 (for example, the CP) may process instructions or data received from at least one of a non-volatile memory or other components by loading the instructions or the data in a volatile memory. Also, the AP 1210 or the cellular module 1221 may store at the non-volatile memory at least one of data received from at least one of other components or data generated by at least one of the other components.

Each of the WiFi module 1223, the BT module 1225, the GPS module 1227, and the NFC module 1228 may include, for example, a processor that may process data received or transmitted by the respective modules. Although FIG. 12 shows the cellular module 1221, the WiFi module 1223, the BT module 1225, the GPS module 1227, and the NFC module 1228 as separate blocks, any combination (for example, two or more) of the cellular module 1221, the WiFi module 1223, the BT module 1225, the GPS module 1227, and the NFC module 1228 may be included in an Integrated Chip (IC) or an IC package according to an embodiment. For example, at least some of the processors corresponding to the respective cellular module 1221, the WiFi module 1223, the BT module 1225, the GPS module 1227, or the NFC module 1228 may be implemented as a single SoC. For example, a CP corresponding to the cellular module 1221 and a WiFi processor corresponding to the WiFi module 1223 may be implemented as a single SoC.

The RF module 1229 may transmit and receive data, for example, RF signals. While not shown, the RF module 1229 may include a transceiver, a Power Amplifier Module (PAM), a frequency filter, or a Low Noise Amplifier (LNA). The RF module 1229 may further include one or more components for transmitting and receiving Electro-Magnetic (EM) waves in free space, such as conductors or conductive wires. Although FIG. 12 shows that the cellular module 1221, the WiFi module 1223, the BT module 1225, the GPS module 1227, and the NFC module 1228 share the single RF module 1229, at least one of the cellular module 1221, the WiFi module 1223, the BT module 1225, the GPS module 1227, or the NFC module 1228 may transmit and receive RF signals via a separate RF module according to an embodiment.

The SIM card 1224 may be a card including a SIM, and may be configured to be inserted into a slot disposed at a specified location of the electronic device. The SIM card 1224 may include a unique identifier (for example, Integrated Circuit Card IDentifier (ICCID)) or subscriber information (for example, International Mobile Subscriber Identity (IMSI)).

The memory 1230 may include an internal memory 1232 or an external memory 1224. The internal memory 1232 may be at least one of, for example, a volatile memory (for example, Dynamic RAM (DRAM), Static RAM (SRAM), or Synchronous Dynamic RAM (SDRAM)) or a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, or NOR flash memory).

According to an embodiment, the internal memory 1232 may be a Solid State Drive (SSD). The external memory 1234 may be, for example, a flash drive (for example, a Compact Flash (CF) drive, a Secure Digital (SD), a micro Secure Digital (micro-SD), a mini Secure Digital (mini-SD), an extreme Digital (xD), or a Memory Stick). The external memory 1234 may be operatively coupled to the electronic device 1201 via various interfaces. According to an embodiment, the electronic device 1201 may further include recording devices (or recording media) such as a Hard Disk Drive (HDD).

The sensor module 1240 may measure physical properties or detect operational states associated with the electronic device 1201, and convert the measured or detected information into electric signals. The sensor module 1240 may include at least one of, for example, a gesture sensor 1240A, a gyro sensor 1240B, an atmospheric pressure sensor 1240C, a magnetic sensor 1240D, an accelerometer 1240E, a grip sensor 1240F, a proximity sensor 1240G, a color sensor 1240H (for example, a Red, Green, Blue (RGB) sensor), a biometric sensor 1240I, a temperature/humidity sensor 1240J, a luminosity sensor 1240K, or an Ultra Violet (UV) sensor 1240M. Additionally or alternatively, the sensor module 1240 may include, for example, an electrical-nose sensor (not shown), an ElectroMyoGraphy (EMG) sensor (not shown), an ElectroEncephaloGram (EEG) sensor (not shown), an InfraRed (IR) sensor (not shown), an iris sensor (not shown), or a fingerprint sensor. The sensor module 1240 may further include a control circuit for controlling one or more sensors included therein.

The input device 1250 may include a touch panel 1252, a (digital) pen sensor 1254, a key 1256, or an ultrasonic input device 1258. The touch panel 1252 may detect a touch input using at least one of, for example, capacitive, resistive, infrared, or ultrasonic methods. The touch panel 1252 may further include a control circuit. A capacitive-type touch panel may detect physical touch inputs or proximity inputs. The touch panel 1252 may further include a tactile layer. Haptic feedback may be provided to the user using the tactile layer.

The (digital) pen sensor 1254 may be implemented, for example, using methods identical to or similar to receiving a touch input from a user, or using a separate detection sheet. The key 1256 may include, for example, a physical button, an optical key, or a keypad. The ultrasonic input device 1258 may be a device configured to identify data by detecting, using a microphone (for example, a microphone 1288), ultrasonic signals generated by a device capable of generating the ultrasonic signal. The ultrasonic input device 1258 may detect data wirelessly. According to an embodiment, the electronic device 1201 may receive a user input from an external device (for example, a computer or a server) connected to the electronic device 1201 using the communication module 1220.

The display module 1260 (for example, the display 150) may include a panel 1262, a hologram device 1264, or a projector 1266. The panel 1262 may be, for example, a Liquid Crystal Display (LCD) or an Active-Matrix Organic Light-Emitting Diode (AM-OLED) display. The panel 1262 may be configured to be, for example, flexible, transparent, or wearable. The panel 1262 and the touch panel 1252 may be implemented as a single module. The hologram device 1264 may utilize the interference of light waves to provide a three-dimensional image in empty space. The projector 1266 may provide an image by projecting light on a display. The display may be positioned, for example, inside or outside the electronic device 1201. According to an embodiment, the display module 1260 may further include a control circuit for controlling the panel 1262, the hologram device 1264, or the projector 1266.

The interface 1270 may include, for example, a High-Definition Multimedia Interface (HDMI) 1272, a Universal Serial Bus (USB) 1274, an optical interface 1276, or a D-sub 1278. The interface 1270 may be incorporated into, for example, the communication interface 160 illustrated in FIG. 1. Additionally or alternatively, the interface 1270 may include, for example, a Mobile High-definition Link (MHL) interface, an SD/MultiMedia Card, or an Infrared Data Association (IrDA) interface.

The audio module 1280 may encode/decode a voice into an electrical signal, and vice versa. At least a part of components of the audio module 1280 may be incorporated in, for example, the I/O interface 140 illustrated in FIG. 1. The audio module 1280 may process audio information input into, or output from, for example, a speaker 1282, a receiver 1284, an earphone 1286, or the microphone 1288.

The camera module 1291 may capture still images or a video. According to an embodiment, the camera module 1291 may include one or more image sensors (for example, a front sensor or a rear sensor), a lens (not shown), an Image Signal Processor (ISP, not shown), or a flash (for example, a Light Emitting Diode (LED) or a Xenon lamp, not shown).

The power management module 1295 may manage power of the electronic device 1200. While not shown, the power management module 1295 may include, for example, a Power Management Integrated Circuit (PMIC), a charger IC, or a battery or fuel gauge.

The PMIC may be disposed, for example, in an IC or an SoC semiconductor. The charging method for the electronic device 1201 may include wired or wireless charging. The charger IC may charge a battery, or prevent excessive voltage or excessive current from a charger from entering the electronic device 1201. According to an embodiment, the charger IC may include at least one of a wired charger IC or a wireless charger IC. The wireless charger IC may be, for example, a magnetic resonance type, a magnetic induction type or an electromagnetic wave type, and may include additional circuits for wireless charging, such as a coil loop, a resonance circuit, or a rectifier.

The battery gauge may measure, for example, a charge level, a voltage while charging, or temperature of the battery 1296. The battery 1296 may store or generate electricity and supply power to the electronic device 1200 using the stored or generated electricity. The battery 1296 may include, for example, a rechargeable battery or a solar battery.

The indicator 1297 may indicate one or more states (for example, boot status, message status, or charge status) of the electronic device 1200 or a part of the electronic device 1200 (for example, the AP 1210). The motor 1298 may convert an electrical signal into a mechanical vibration. While not shown, the electronic device 1200 may include a device for supporting mobile TV (for example, a GPU). The device for supporting mobile TV may process media data compliant with, for example, Digital Multimedia Broadcasting (DMB), Digital Video Broadcasting (DVB), or media flow.

Each of components of an electronic device described above according to the present disclosure may include one or more components, and each component's name may vary according to the type of the electronic device. The electronic device according to the present disclosure may include at least one of the above-described components, and some may be omitted or additional components may be included. Also, some of the components of the hardware according to the present disclosure may be combined into a single entity and perform functions identical to those of the respective components before their combination.

The term "module" as used herein may include its ordinary meaning including, but not limited to, for example, a unit of one, or a combination of two or more, hardware, software or firmware. The term "module" may be used interchangeably with a term such as unit, logic, logical block, component, or circuit. A module may be the smallest unit for performing one or more functions, or a portion thereof. A module may be implemented mechanically or electronically. For example, a module according to the present disclosure may include at least one of a known or to-be-developed Application-Specific Integrated Circuit (ASIC) chip, Field-Programmable Gate Array (FPGA) or programmable logic device that perform certain operations.

According to various embodiments, at least a part of devices (for example, modules or their functions) or methods (for example, operations) according to the present disclosure may be implemented, for example, in the form of a programming module, as commands stored in a computer-readable storage medium. When a command is executed by one or more processors (for example, the processor 120), the one or more processors may execute a function corresponding to the command. The computer-readable storage medium may be, for example, the memory 130. At least a part of the programming module may be implemented (for example, executed) by the processor 120. At least a part of the programming module may include, for example, a module, a program, a routine, a set of instructions, and/or a process to execute one or more functions.

The computer-readable recording medium may include any kind of hardware device configured specially to store a program command (for example, a programming module). Examples of the hardware device may include magnetic media such as a hard disk, floppy disk, and a magnetic tape, optical media such as a Compact Disc Read Only Memory (CD-ROM) and a Digital Versatile Disc (DVD), magneto-optical media such as a floptical disk, a ROM, a RAM, a flash memory, and the like. The program command may include a premium language code that can be executed in a computer using an interpreter as well as a mechanical code produced by a compiler. The above-mentioned hardware device may be implemented as one or more software modules to perform the operations of the present disclosure and vice versa.

A module or a programming module according to the present disclosure may include one or more of the above-described components, may omit a portion thereof, or may include additional components. Operations that are performed by a module, a programming module or other components according to the present disclosure may be processed in a serial, parallel, repetitive or heuristic manner, and some operations may be omitted or additional operations may be added.

According to various embodiments, a storage medium storing commands is provided. The commands are configured to allow at least one processor to perform at least one operation, when the commands are executed by the at least one processor. In a computer-readable storage medium including a command for controlling a display of an electronic device, the at least one operation may include determining whether an ear-jack terminal cap has been inserted into an ear-jack terminal of the electronic device, determining whether the electronic device moves in correspondence with a specific gesture, with a button of the ear-jack terminal cap pressed, if the ear-jack terminal cap has been inserted into the ear-jack terminal, and performing a function corresponding to the gesture, if the movement of the electronic device corresponds to the gesture.

Alternatively, the at least one operation may include determining whether an ear-jack terminal cap has been inserted into an ear-jack terminal provided in an electronic device, and performing a function corresponding to a specific gesture, if a movement of the electronic device corresponds to the specific gesture.

As is apparent from the foregoing description of the electronic device and method for controlling the same according to various embodiments of the present disclosure, a user can control execution of a specific function(s) or operation(s) set by the user through an ear-jack terminal cap interworking with the electronic device. Therefore, user convenience in using the electronic device can be increased.

No claim element herein is to be construed under the provisions of 35 U.S.C. 112, sixth paragraph, unless the element is expressly recited using the phrase "means for".

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for controlling an electronic device, comprising:
   determining whether an ear-jack terminal cap is into an ear-jack terminal provided in the electronic device and in response;
   setting at least one function for a button of the ear-jack terminal cap; and
   performing the set at least one function upon receipt of an input of the button of the ear-jack terminal cap,
   wherein the setting of the at least one function for the button of the ear-jack terminal cap comprises:
      displaying button types controllable through the ear-jack terminal cap, if the ear-jack terminal cap is inserted into the ear-jack terminal, and
      receiving an input selecting at least one corresponding to the set at least one function of the displayed button types.

2. The method of claim 1, wherein the ear-jack terminal cap includes a first resistor configured to assist in determining whether the ear-jack terminal cap is inserted and a second resistor configured to assist in determining whether the input of the button is received.

3. The method of claim 2, wherein the determination of whether the ear-jack terminal cap is inserted comprises determining whether the ear-jack terminal cap is inserted by comparing a voltage value corresponding to a resistance value of the first resistor with a voltage value pre-stored in the electronic device.

4. The method of claim 2, wherein the determination of whether the input of the button is received comprises:
   measuring voltage values applied to the first and the second resistors according to a composite resistance value of the first and the second resistors; and
   comparing the voltage value applied to the second resistor with a voltage pre-stored in the electronic device.

5. The method of claim 1, wherein the ear-jack terminal cap includes a first resistor configured to assist in determining whether the ear-jack terminal cap is inserted and a plurality of second resistors configured to assist in determining whether the input of the button is received.

6. The method of claim 5, further comprising:
   receiving user inputs setting particular button types to correspond to each of the plurality of second resistors; and
   storing information about the particular button types to correspond with each of the plurality of second resistors.

7. A method for controlling an electronic device, the method comprising:
   determining whether an ear-jack terminal cap is inserted into an ear-jack terminal provided in the electronic device; and
   if the ear-jack terminal cap is inserted into the ear-jack terminal, performing a function corresponding to a specific gesture in response to a movement of the electronic device corresponding to the specific gesture.

8. The method of claim 7, further comprising, if the ear-jack terminal cap is inserted into the ear-jack terminal, determining whether the electronic device moves in correspondence with the specific gesture while a button provided in the ear-jack terminal cap is pressed.

9. An electronic device comprising:
   a processor;
   a display; and
   an ear-jack terminal,
   wherein the processor is configured to determine whether an ear-jack terminal cap is inserted into the ear-jack terminal, to display button types controllable through the ear-jack terminal cap, if the ear-jack terminal cap is inserted into the ear-jack terminal, to receive an input selecting at least one of the button types and to control execution of at least one function corresponding to the selected at least one of the button types upon receipt of an input of a button of the ear-jack terminal cap.

10. The electronic device of claim 9, wherein the ear-jack terminal cap includes a first resistor configured to assist in determining whether the ear-jack terminal cap is inserted and a second resistor configured to assist in determining whether the input of the button is received.

11. The electronic device of claim 10, wherein the processor determines whether the ear-jack terminal cap is inserted by comparing a voltage value corresponding to a resistance value of the first resistor with a voltage value pre-stored in the electronic device.

12. The electronic device of claim 10, wherein the processor measures voltage values applied to the first and the second resistors according to a composite resistance value of the first and the second resistors, and determines whether the input of the button is received by comparing a voltage value applied to the second resistor with a voltage pre-stored in the electronic device.

13. The electronic device of claim 9, wherein the ear-jack terminal cap includes a first resistor configured to assist in determining whether the ear-jack terminal cap is inserted and a plurality of second resistors configured to assist in determining whether the input of the button is received.

14. The electronic device of claim 13, wherein if the processors receive user inputs setting particular button types to correspond to each of the plurality of second resistors, storing information about the particular button types to correspond with each of the plurality of second resistors.

15. An ear-jack terminal cap interworking with an electronic device, comprising:
   a fixing portion configured to be inserted into the electronic device and fixing the ear-jack terminal cap inserted into the electronic device;
   a rotation portion disposed at a top end of the fixing portion and configured to receive an input to execute a function corresponding to a button type set by a user; and
   an ear-jack insertion portion configured to be inserted into an ear-jack terminal provided in the electronic device and electrically connected to the electronic device,
   wherein the ear-jack insertion portion includes a first resistor configured to assist in determining whether the ear-jack terminal cap is inserted and a second resistor electrically connected to the rotation portion, configured to assist in determining whether the input is received, and
   wherein the second resistor is a variable resistor which is variable according to a rotation of the rotation portion.

16. The method of claim 1, wherein the receipt of the input of the button of the ear-jack terminal cap comprises:
   receiving a changed resistance value of a variable resistor in the ear-jack terminal upon a rotation of the button.

17. The electronic device of claim 9, wherein the receipt of the input of the button of the ear-jack terminal cap comprises:
   receiving a changed resistance value of a variable resistor in the ear-jack terminal upon a rotation of the button.

* * * * *